(12) United States Patent
Harrison et al.

(10) Patent No.: US 10,967,957 B2
(45) Date of Patent: Apr. 6, 2021

(54) METHODS AND APPARATUS TO EXTEND A LEADING-EDGE VORTEX OF A HIGHLY-SWEPT AIRCRAFT WING

(71) Applicant: The Boeing Company, Chicago, IL (US)

(72) Inventors: Neal A. Harrison, Lake Forest, CA (US); Anthony J. Sclafani, Alta Loma, CA (US); Lie-Mine Gea, Irvine, CA (US)

(73) Assignee: THE BOEING COMPANY, Chicago, IL (US)

( * ) Notice: Subject to any disclaimer, the term of this patent is extended or adjusted under 35 U.S.C. 154(b) by 550 days.

(21) Appl. No.: 15/385,444

(22) Filed: Dec. 20, 2016

(65) Prior Publication Data

US 2018/0170526 A1    Jun. 21, 2018

(51) Int. Cl.
| | |
|---|---|
| B64C 23/06 | (2006.01) |
| B64C 9/36 | (2006.01) |
| B64C 3/10 | (2006.01) |
| B64C 9/28 | (2006.01) |
| B64C 1/00 | (2006.01) |
| B64C 21/08 | (2006.01) |
| B64C 21/02 | (2006.01) |

(52) U.S. Cl.
CPC .......... *B64C 23/06* (2013.01); *B64C 1/0009* (2013.01); *B64C 3/10* (2013.01); *B64C 9/28* (2013.01); *B64C 9/36* (2013.01); *B64C 21/025* (2013.01); *B64C 21/08* (2013.01); *B64C 2230/26* (2013.01); *Y02T 50/10* (2013.01)

(58) Field of Classification Search
CPC .......... B64C 1/0009; B64C 3/10; B64C 5/12; B64C 9/28; B64C 9/348; B64C 9/34; B64C 9/36; Y02T 50/162
See application file for complete search history.

(56) References Cited

U.S. PATENT DOCUMENTS

| | | | | |
|---|---|---|---|---|
| 2,601,962 A * | 7/1952 | Douglas | .................... | B64C 5/04 244/201 |
| 3,642,234 A * | 2/1972 | Kamber | ................ | B64C 1/0009 222/146.1 |
| 3,680,816 A * | 8/1972 | Mello | ........................ | B64C 5/12 244/46 |
| 3,738,595 A * | 6/1973 | Bouchnik | .................. | B64C 3/56 244/218 |
| 3,848,831 A * | 11/1974 | Geary | ........................ | B64C 9/36 244/110 D |
| 3,883,094 A * | 5/1975 | Mederer | .................... | B64C 5/10 244/45 A |
| 3,926,389 A * | 12/1975 | Mederer | .................... | B64C 5/04 244/45 A |
| 4,003,533 A * | 1/1977 | Carter | ........................ | B64C 1/00 244/217 |

(Continued)

*Primary Examiner* — Michael H Wang
(74) *Attorney, Agent, or Firm* — Hanley, Flight & Zimmerman, LLC

(57) ABSTRACT

Methods, apparatus, and articles of manufacture to extend a leading-edge vortex of a highly-swept wing aircraft wing are disclosed. An example apparatus includes a shoulder wing coupled to a fuselage of an aircraft above a highly-swept wing of the aircraft, the shoulder wing operative in a first position to extend a leading-edge vortex spanwise along the highly-swept wing of the aircraft.

20 Claims, 17 Drawing Sheets

(56) References Cited

U.S. PATENT DOCUMENTS

| | | | | |
|---|---|---|---|---|
| 4,093,156 A * | 6/1978 | Coe, Jr. | B64C 30/00 | 244/218 |
| 4,165,849 A * | 8/1979 | Fox | B64C 9/32 | 244/113 |
| 4,615,497 A * | 10/1986 | Seeler | B64C 13/16 | 244/76 R |
| 4,703,905 A * | 11/1987 | Corbett | B64G 1/62 | 244/135 R |
| 4,739,957 A * | 4/1988 | Vess | B64C 9/34 | 244/199.1 |
| 5,249,762 A * | 10/1993 | Skow | B64C 7/00 | 244/199.1 |
| 5,282,591 A * | 2/1994 | Walters | B64C 3/40 | 244/198 |
| 5,366,180 A * | 11/1994 | Wainfan | B64C 5/04 | 244/45 A |
| 5,398,888 A * | 3/1995 | Gerhardt | B64C 5/12 | 244/3.27 |
| 5,495,999 A * | 3/1996 | Cymara | B64C 5/12 | 244/218 |
| 5,772,155 A * | 6/1998 | Nowak | B64C 5/08 | 244/200.1 |
| 5,992,796 A * | 11/1999 | Smith | B64C 1/26 | 244/45 A |
| 6,360,997 B1 * | 3/2002 | Saiz | B64C 3/50 | 244/201 |
| 8,191,820 B1 * | 6/2012 | Westra | B64C 9/12 | 244/207 |
| 9,193,444 B2 * | 11/2015 | Weber | B64C 5/12 | |
| 2005/0045763 A1 * | 3/2005 | Morgenstern | B64C 9/24 | 244/10 |
| 2005/0067525 A1 * | 3/2005 | Morgenstern | B64C 3/16 | 244/10 |
| 2006/0157613 A1 * | 7/2006 | Adamson | B64C 3/50 | 244/1 N |
| 2012/0205490 A1 * | 8/2012 | Whitehouse | B64C 5/02 | 244/89 |
| 2016/0137290 A1 * | 5/2016 | Emerick | B64C 21/02 | 244/36 |
| 2017/0341730 A1 * | 11/2017 | Dorsett | B64C 5/10 | |
| 2017/0341731 A1 * | 11/2017 | Dorsett | B64C 9/323 | |

* cited by examiner

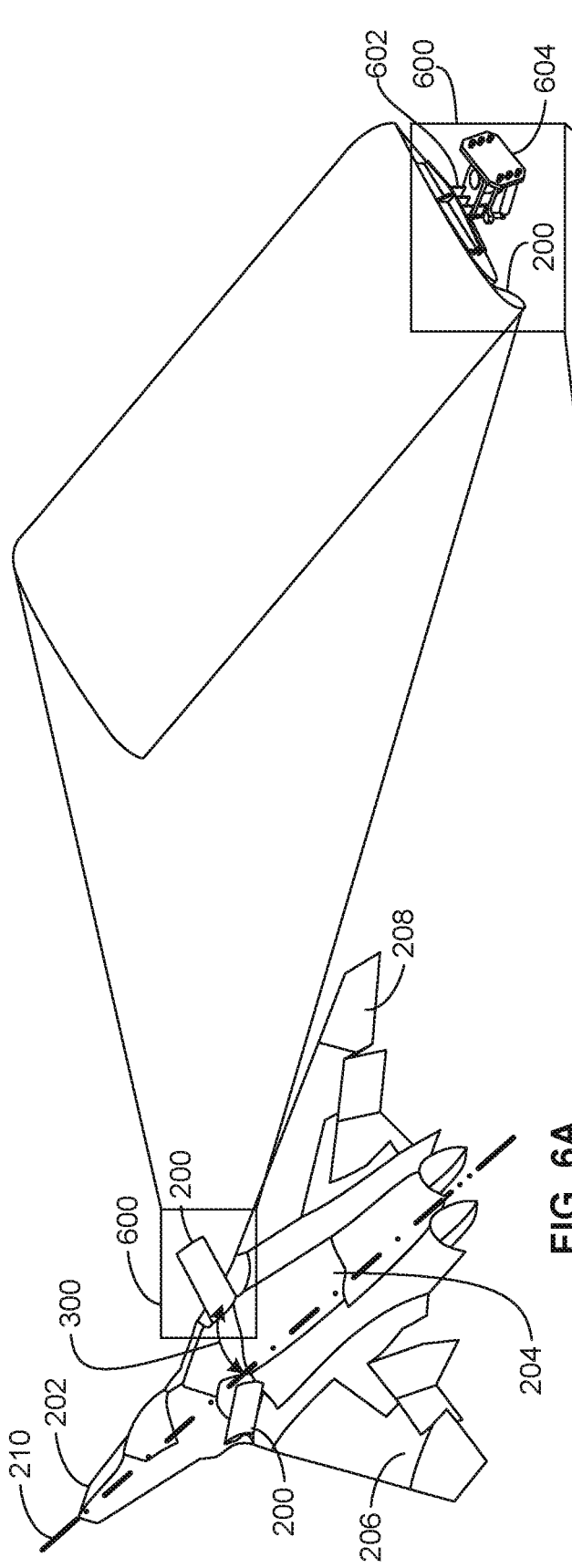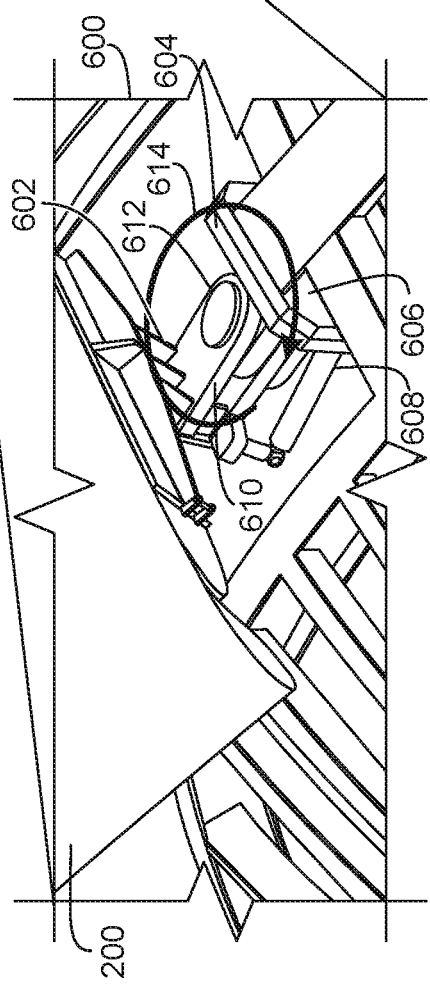

_US 10,967,957 B2_

METHODS AND APPARATUS TO EXTEND A LEADING-EDGE VORTEX OF A HIGHLY-SWEPT AIRCRAFT WING

FIELD OF THE DISCLOSURE

This disclosure relates generally to aircraft and, more particularly, to methods and apparatus to extend a leading-edge vortex of a highly-swept aircraft wing.

BACKGROUND

Aircraft have become increasingly specialized to meet a growing number of mission profiles for a wide variety of commercial and military applications. Aircraft are being customized due to various parameter constraints impacting efficiency, maneuverability, and speed of the aircraft. In the commercial aircraft industry, a heavy emphasis is placed on the fuel economy of an aircraft. This emphasis results in driving many design parameters towards increasing the fuel economy of the aircraft. However, in military and reconnaissance flight applications, emphasis areas include payload capacity, stealth ability as well as landing on and taking-off from a range of runway sizes.

The main wings of an aircraft are painstakingly designed to meet a myriad of in-flight parameters that include generating a required amount of lift while exposing the aircraft to a minimal amount of drag. The main wings are also designed dependent upon whether the aircraft has a tail assembly. An aircraft with a tail assembly uses both the main wings and the tail surfaces to assist with aerodynamic control and stabilization. An aircraft without a tail assembly, commonly called a tailless aircraft, incorporates the pitch and roll aerodynamic control and stabilization functions into the main wings of the aircraft.

A tailless aircraft can be further customized with swept main wings. A swept wing is angled (i.e., swept) either forward or backward from the root of the wing. An angle or degree to which the main wings are swept can vary. The angle at which the wing is swept is referred to as the sweep angle. The sweep angle for wings on a subsonic aircraft (e.g., a commercial transport aircraft, a general aviation aircraft, etc.) may range from approximately 0-40 degrees, while the sweep angle for wings on a high-speed aircraft (e.g., a fighter jet) can be 45 degrees or more. Aircraft wings that have a sweep angle of approximately 45 degrees or more are referred to as highly-swept aircraft wings. Highly-swept wings may be classified as either subsonic highly-swept wings or supersonic highly-swept wings. For example, highly-swept wings with a larger leading edge radius may be better suited for subsonic flight (e.g., flight below speed of sound), while highly-swept wings with a smaller leading edge radius may be better suited for supersonic flight (e.g., flight at or above speed of sound). Consequently, an aircraft that has main wings where the sweep angles are more than 45 degrees are referred to as highly-swept wing aircraft, or highly swept aircraft. Highly-swept wings allow an aircraft to reach higher speeds during cruise and make maneuvers at high-angles of attack. However, utilizing highly-swept wings in a tailless aircraft design may cause the aircraft to become uncontrollable at low speed. For example, the tailless aircraft design may produce lift at low speed (e.g., a speed at which the aircraft is landing, a speed at which the aircraft is taking off, etc.) at an expense of reduced control due to an absence of a tail to trim out an induced pitching moment.

SUMMARY

An example apparatus includes a shoulder wing coupled to a fuselage of an aircraft above a highly-swept wing of the aircraft, the shoulder wing operative in a first position to extend a leading-edge vortex spanwise along the highly-swept wing of the aircraft.

Another example apparatus includes a resilient skin operatively coupled to a fuselage portion of an aircraft, an actuator operatively coupled to the resilient skin, the actuator to move the resilient skin from a first position to a second position, the second position to affect a leading-edge vortex above a highly-swept wing of the aircraft, and a processor to control the actuator to move the resilient skin to the second position based on a flight condition of the aircraft.

Yet another example apparatus disclosed herein includes an air wall operatively coupled to a fuselage of an aircraft proximate a leading-edge of a highly-swept wing of the aircraft and a processor to move the air wall from a first position to a second position, the second position to affect a leading-edge vortex above a highly-swept wing of the aircraft.

BRIEF DESCRIPTION OF THE DRAWINGS

FIGS. 6A, 6B, and 6C are detailed views of an example shoulder wing actuator apparatus for an example vortex lift enhancer apparatus that includes an example shoulder wing apparatus.

Figure 1A:
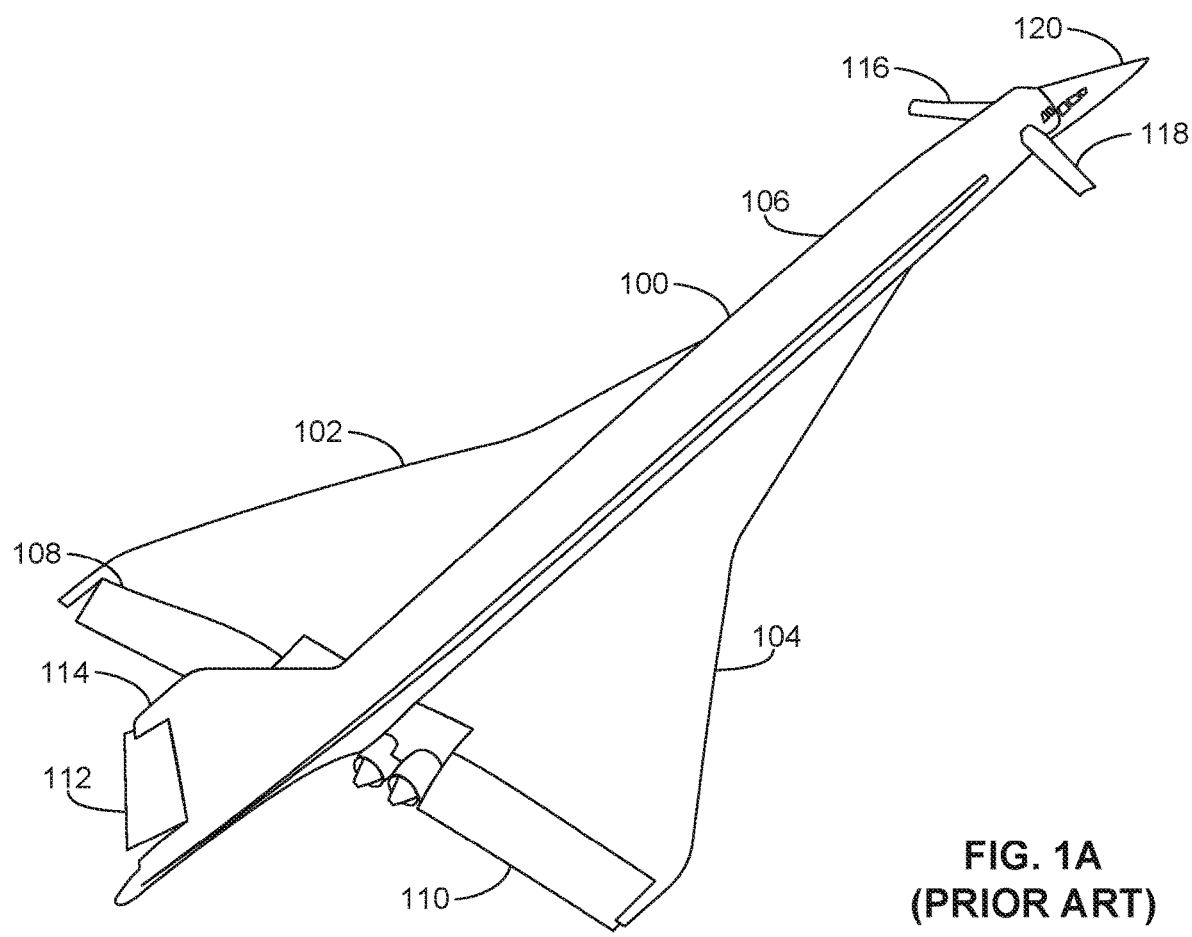
FIGS. 1A and 1B illustrate a known aircraft that uses forward canards.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used herein, the terms "coupled" and "operatively coupled" are defined as connected directly or indirectly (e.g., through one or more intervening structures and/or layers).

DETAILED DESCRIPTION

Over the years, highly-swept wing aircraft have become increasingly utilized for operations that require a high-degree of maneuverability and speed at high-angles of attack. Highly-swept wing aircraft include highly-swept wings that enable the aircraft to fly at a high cruise speed while maintaining a high degree of maneuverability at lower speeds. As air travels over a wing parallel to its local chord line it accelerates, causing a drop in the local air pressure. If the aircraft is traveling at sufficient speed, then the air traveling over the wing of the aircraft may accelerate above the speed of sound (i.e. above Mach 1). Airflow traveling faster than the speed of sound is referred to as supersonic airflow. The air eventually returns to a speed below the speed of sound (e.g., below supersonic speed), at which point a shock wave is created. A shock wave generates a significant amount of drag that can slow the aircraft or separate the air from the wing of the aircraft, thereby causing an increased amount of drag (e.g., wave drag).

At high speeds (e.g., speeds at or exceeding Mach 1), a highly-swept wing aircraft reduces the amount of drag by sweeping the supersonic shockwave back to a higher angle relative to the onset flow. Sweeping the supersonic shockwave backwards delays a start of the supersonic airflow over the wing. One skilled in the art may view the effect of the highly-swept wing as effectively using a thinner airfoil section (e.g., a thickness-to-chord ratio is reduced). For example, air traveling over the highly-swept wing has more time in which to adjust to the increased speeds (e.g., due to an increased chord length), thus delaying the supersonic airflow.

On a subsonic wing aircraft (e.g., an aircraft with wings that have a sweep angle of approximately 0-40 degrees), the majority of the airflow over the wing travels parallel to the chord line of the aircraft. However, on a swept wing aircraft (e.g., a highly-swept wing aircraft), only a portion of the total airflow flows parallel to the chord line. The remaining amount of the total airflow flows approximately parallel to the wing sweep angle, referred to herein as spanwise flow.

At high angles of attack, the highly-swept wings of highly-swept wing aircraft generate lift via a phenomenon called vortex lift. In the case of the highly-swept wing aircraft, a vortex is shed from the leading edge of each wing approximately parallel to the leading-edges of the wings. When the oncoming air encounters a small leading edge radius of a highly-swept wing, the air is unable to negotiate the sharp turn around the small leading-edge of the highly-swept wing, therefore the air separates from the leading-edge. For example, the expansion of the air travelling around the leading-edge may result in a very high negative pressure and a subsequent steep adverse pressure gradient. The steep adverse pressure gradient can readily cause the flow of air to separate from the leading-edge. When separation occurs, the pressure gradients pull the air outboard along the wing (e.g., spanwise along the wing), which forces the air to collimate into a vortex. The vortex is swept back up over the upper surface of the highly-swept wing. The strong vorticity creates a low-pressure region (e.g., suction) above the highly-swept wing that effectively lifts the highly-swept wing. By manipulating the length and shape of the leading-edge vortices, the highly-swept wing aircraft can generate increased amounts of lift, especially at high angles of attack.

The utilization of the highly-swept wing to reduce drag at high speed comes at an expense of reducing an amount of lift the wing can produce at low speed. Furthermore, removing the typical aircraft tail reduces the amount of control at low speeds. At high speeds, for highly-swept wing aircraft, this is not a significant problem as the high speeds enable a minimal angle of attack to produce sufficient lift. The angle of attack is the angle between a direction of oncoming air or relative wind and a reference line on the aircraft or the wing. For example, the reference line may be a centerline of a fuselage of the aircraft. In some examples, the angle of attack is the difference between a pitch angle and a flight path angle of the aircraft. Example aircraft operations that require a high angle of attack include landing and takeoff. However, at slow speeds, for highly-swept wing aircraft, a reduction in the amount of lift the wing produces is problematic because, at slow speeds, the aircraft is at a high angle of attack. The high angle of attack at slow speeds may approach a stall angle of the aircraft, where the stall angle is partially determined by the sweep angle of the aircraft. For example, a higher sweep angle of the wings of the aircraft may result in a lower lift coefficient of the aircraft, and the lower lift coefficient of the aircraft may result in a lower stall angle. At high angles of attack, the stall angle may be exceeded, causing performance of the aircraft to be compromised.

Mission profiles of non-commercial highly-swept wing aircraft (e.g., drones, fighter jets, reconnaissance aircraft, etc.) may include a requirement for an ability to land on abbreviated runways. A typical example of an abbreviated runway is an aircraft carrier. An aircraft carrier flight deck has a limited deck length allotted for aircraft operations (e.g., a landing operation, a takeoff operation, etc.). For highly-swept wing aircraft, abbreviated runways can pose a significant challenge during a landing or takeoff operation due to the reduced amount of lift the highly-swept wings of the aircraft can generate. In some examples, to compensate for a reduced amount of lift, the aircraft must land at higher speeds than is desirable.

Previously designed highly-swept wing aircraft such as the Russian Tupolev Tu-144 experienced similar challenges in regards to operations that required maintaining control of the aircraft at high angles of attack such as, for example, landing on and taking-off from a runway. The Tu-144 utilized elevons, which are aircraft control surfaces that combine the functions of an elevator and an aileron. However, when the Tu-144 moved its elevons in a downward direction to increase an amount of lift generated by wings of the Tu-144, the nose of the aircraft would subsequently be pitched in a downward direction. To counteract this nose-downward movement, a variation of the Tu-144, the Tu-144D, deployed two canards (e.g., moustache canards, etc.) above the nose of the aircraft, with one canard on each side of the nose. The canards were small, high-lift, high aspect ratio devices deployed for low-speed flight to improve handling and stability at high angles of attack during landing and takeoff. The Tu-144 canards were stowed after takeoff to avoid additional drag that would be generated at higher speeds. The location of the Tu-144 canards above the nose of the aircraft indicates that their main purpose was to cancel the nose-down pitching effect caused by the actuation of the elevons.

Example vortex lift enhancer (VLE) apparatus disclosed herein are operative to extend or strengthen a leading-edge vortex of a highly-swept wing aircraft. In general, the example VLE apparatus disclosed herein utilizes a main element of a structure coupled to a fuselage of the aircraft to affect a pressure field (e.g., an air pressure field, etc.) or redirect airflow above the wing of the aircraft. The main element of the structure manipulates the leading-edge vortex generated by the highly-swept wing by extending the leading-edge vortex spanwise along the wing. An optimal location of the leading-edge vortex (e.g., a location that optimizes an aerodynamic property of the aircraft) may be at an angle with respect to a longitudinal axis of the aircraft, where the leading-edge vortex is approximately parallel to the leading-edge of the wing of the aircraft.

In some disclosed examples, the VLE apparatus increases spanwise flow and drives the leading-edge vortex closer to the leading-edge of the highly-swept wing. The airflow environment close to the leading-edge is more conducive to vortex health, so the example VLE apparatus extends the vortex life by driving the vortex further down the span. Enhanced lift is achieved because there is more area affected by the high-velocity/low pressure region of the vortex. In some instances, the example VLE apparatus delays the burst of the leading-edge vortex. The example VLE apparatus may increase the lift-to-drag ratio of the aircraft (e.g., the lift of the aircraft grows faster than the drag of the aircraft). Increasing the lift-to-drag ratio of the aircraft enables slower landing speeds, which may result in a decrease in aircraft loads during landing, which may result in a decrease in aircraft weight and cost. In some examples, the VLE apparatus produces lift for a section of the aircraft other than the main wings of the aircraft. For example, the VLE apparatus may produce lift for a tail of an aircraft that includes one or more tail surfaces. The VLE apparatus may be strategically located on the aircraft to produce lift for the section of the aircraft that may require enhanced lift capabilities. Additionally or alternatively, the example VLE disclosed herein may be a deployable or fixed device. For example, the VLE apparatus may adjust in position, shape, and/or size via one or more actuators. In another example, the VLE apparatus may remain fixed in position, shape, and/or size.

In some example VLE apparatus disclosed herein, the above-described structure is implemented as a shoulder wing apparatus coupled to a fuselage of a highly-swept wing aircraft. An example aircraft may use two example shoulder wings, one on each side of the aircraft. In some examples, the shoulder wing apparatus is located on the top surface of the fuselage, towards the front of the highly-swept wings of the aircraft, but behind the cockpit of the aircraft. For example, the shoulder wing apparatus may be located on the top surface of the fuselage towards the front of the highly-swept wings to affect the air pressure fields impacting the generated vortices. The shoulder wing apparatus may be located aft of the engine inlet to prevent disruption in engine intake flow.

The example shoulder wing apparatus described herein may be in a stowed, deployed, or intermediate position. The stowed position may be a position in which the example shoulder wing apparatus is oriented longitudinally along the fuselage of the aircraft. The deployed position may be the position in which the example shoulder wing apparatus is oriented at an angle relative to the longitudinal axis of the fuselage. The intermediate position may be the position in which the example shoulder wing apparatus is oriented at an angle less than the angle at which the shoulder wing apparatus is deployed. The example shoulder wing apparatus may be moved by an actuator. In some examples, the actuator is an electric actuator, a hydraulic actuator, a mechanical actuator, a pneumatic actuator, and/or a shape memory alloy based actuator. For example, the shoulder wing apparatus may be moved by a hydraulic actuator, where the hydraulic actuator includes a cylinder motor and/or a fluid motor that utilizes hydraulic power to facilitate the movement of the shoulder wing apparatus. The mechanical motion of the hydraulic actuator may provide a linear, oscillatory or rotary output motion that adjusts a position of the example shoulder wing apparatus. Additionally or alternatively, the example shoulder wing apparatus disclosed herein may be fixed in position, shape, and/or size.

In some example VLE apparatus disclosed herein, the shoulder wing apparatus includes one or more elements to extend a leading-edge vortex of highly-swept wing aircraft. In some examples, the example shoulder wing apparatus includes one or more slats (e.g., leading-edge slats). Slats are aerodynamic surfaces used to prevent a leading-edge of an aircraft wing from stalling prematurely. The slats may be used to extend the lift curve of the aircraft wing to allow the aircraft to operate at higher angles of attack. In some examples, the slats are operatively coupled to an actuator (e.g., a slat actuator) to move the slats from a stowed position to a deployed position or an intermediate position. A slat actuator may be operatively coupled to a motor, where a rate of motor rotation may be determined by a processor. For example, a processor may determine that an increased level of lift is necessary for an aircraft maneuver and calculate a desired position of one or more slats. The processor may calculate a required rate at which and/or a duration for which a shaft of the motor may be rotated to enable the actuator to move the slat from its current position to the desired slat position. In some instances, the processor may calculate a required rate at which and/or a duration for which one or more shafts may be rotated, where the shaft(s) are operatively coupled to one or more motors operatively coupled to one or more actuators to enable the movement of one or more slats. Alternatively, the slats may be fixed in position, shape, and/or size. Additionally and/or alternatively, one or more slats may be deployable (e.g., one or more slats may adjust in position) while the remaining slats may be fixed in position.

In some example VLE apparatus disclosed herein, the shoulder wing apparatus includes one or more flaps (e.g., trailing-edge flaps). Flaps are aerodynamic surfaces on a trailing edge of a wing of an aircraft that may be used to increase lift of the wing at a given airspeed. For example, deploying the flap(s) during flight may increase the lift-to-drag ratio experienced by the aircraft to lower the approach speed of the aircraft and/or to increase the angle of attack for landing (e.g., the angle of descent). In some examples, the flaps are operatively coupled to an actuator (e.g., a flap actuator) to move them from a stowed position to a deployed position, or an intermediate position. The flap actuator may be operatively coupled to a motor, where a rate of motor rotation may be determined by a processor. For example, a processor may determine that an increased level of lift is necessary for an aircraft maneuver and calculate a desired position of one or more flaps. The processor may calculate a required rate at which and/or a duration for which a shaft of the motor may be rotated to enable the actuator to move the flap from its current position to the desired flap position. In some instances, the processor may calculate a required rate at which and/or a duration for which one or more shafts may be rotated, where the shaft(s) are operatively coupled to one or more motors operatively coupled to one or more actuators to enable the movement of one or more flaps. Alternatively, the flaps may be fixed in position, shape, and/or size. Additionally and/or alternatively, one or more flaps may be deployable (e.g., one or more flaps may adjust in position) while the remaining flaps may be fixed in position.

In some disclosed examples, the example shoulder wing apparatus is stowed in a shoulder wing housing when not in operation. The shoulder wing housing may include one or more doors operatively coupled to an actuator. The actuator may be attached to a motor controlled by a processor. For example, a processor may determine that the example shoulder wing apparatus is required for an aircraft operation (e.g., a landing operation, a takeoff operation, etc.). The processor may determine a desired position of the shoulder wing housing door(s). The processor may calculate a required rate at which and/or a duration for which a shaft of the motor may be rotated to enable the actuator to move the shoulder wing housing door(s) to the desired position.

In some example VLE apparatus disclosed herein, the shoulder wing portion of the shoulder wing apparatus has one or more wing elements. In some examples, the shoulder wing has a single wing element. For example, the shoulder wing may be a wing that is a single structure. A single structure shoulder wing may be operatively coupled to a shoulder wing actuator to enable movement of the shoulder wing. The shoulder wing actuator may affect a leading-edge vortex of a highly-swept wing of an aircraft by adjusting a position of the single structure shoulder wing. For example, the shoulder wing actuator may cause the single structure shoulder wing to move from a stowed position to a deployed position, or an intermediate position between the stowed and deployed positions.

In some disclosed examples, the shoulder wing has two or more wing elements or structures. For example, the shoulder wing may be a wing that has multiple elements or structures that may be actuated individually. The individual elements or structures of the multiple element shoulder wing may each be controlled by a corresponding actuator (i.e., each element has its own actuator). The multiple shoulder wing actuators may affect a leading-edge vortex of the highly-swept wing of the aircraft by adjusting the positions of the multiple elements. For example, a first shoulder wing actuator may cause a first element of the multiple element shoulder wing to move from a stowed position to a first position. When the first element of the multiple element shoulder wing approaches the first position, a second shoulder wing actuator may cause a second element of the multiple element shoulder wing to move from a second position to a third position. Additional elements of the multiple element shoulder wing may be similarly adjusted or moved. In some examples, the multiple element shoulder wing has a single shoulder wing actuator that causes the multiple elements of the multiple element shoulder wing to move collectively.

In some example VLE apparatus disclosed herein, an aircraft has one or more perforations (e.g., air jets) that allow for an expulsion and/or a suction of air and/or other gases to affect a leading-edge vortex of a highly-swept wing of the aircraft to perform flow control or active flow control (AFC). In some disclosed examples, the shoulder wing apparatus includes one or more perforations. For example, the shoulder wing may have multiple perforations that may be individually connected to a valve or collectively connected to one or more valves via pneumatic tubes that may be actuated to enable the expulsion or the suction of air. In some examples, the one or more valves may be actuated via an actuator (e.g., a zero-mass-flux (ZMF) actuator, a piezoelectric actuator, etc.) to connect an air supply to the perforation(s) to enable an expulsion of pressurized air through the perforation(s). For example, the valve may be actuated to enable the perforation(s) to expel air to disrupt, enhance or redirect the flow of air over the wing of the aircraft. In some instances, the one or more valves may be actuated to connect a suction mechanism (e.g., a vacuum source) to the perforation(s) to enable the suction of air through the perforation(s). For example, the valve may be actuated to enable the perforation(s) to pull in boundary layer airflow via suction to smooth the air flowing over the surface of the wing of the aircraft to reduce drag and enhance lift.

In some disclosed examples, a processor may be used to determine which valves are actuated to manipulate the leading-edge vortex to enhance an amount of lift generated by a highly-swept wing of the aircraft. For example, the processor may determine that one or more valves are to be actuated to expel air through the perforation(s) to direct the leading-edge vortex above the highly-swept wing of the aircraft spanwise along the leading-edge of the highly-swept wing. In some instances, the processor may determine that one or more valves are to be actuated to pull in air through the perforation(s) to adjust the leading-edge vortex above the highly-swept wing of the aircraft spanwise along the leading-edge of the highly-swept wing.

In some example VLE apparatus disclosed herein, a resilient skin such as, for example, a balloon structure, a conformal bump structure, etc. is operatively coupled to a portion of the fuselage proximate to a leading-edge of a highly-swept wing of an aircraft. For example, the resilient skin may be an elastic membrane, an elastic skin, a flexible membrane, a flexible skin, etc. The resilient skin, when deployed, projects above the surface of the fuselage. The material of the resilient skin may include an elastic material or a flexible material. For example, the material of the resilient skin may include a composite material, a metallic material, a plastic material, etc. In some examples, the resilient skin is operatively coupled to an actuator (e.g., a cam actuator, a plunger actuator, etc.).

In some instances, the resilient skin may be operatively coupled to a structure (e.g., a cylindrical structure) via the actuator (e.g., the cam actuator, the plunger actuator, etc.). The structure may push against the resilient skin to form a conformal bump when the resilient skin is deployed. The resilient skin, when stowed, does not project above the surface of the fuselage and is, instead, flush with a curvature of the fuselage. One or more resilient skins may be utilized. For example, there may be two resilient skins on the fuselage, with one resilient skin on each side of the fuselage.

In some examples, the resilient skin(s) may be detached, ejected, or expelled upon command. For example, the resilient skin(s) may be ejected from the fuselage of the aircraft after the aircraft has completed a take-off operation. The surface of the resilient skin(s) may alter oncoming airflow. By altering the oncoming airflow, the resilient skin(s) may direct the leading-edge vortex above the fuselage spanwise along the leading-edge of the highly-swept wing aircraft. By altering the leading-edge vortex, the resilient skin(s) may enhance an amount of lift the highly-swept wing aircraft may generate. In some examples, the resilient skin produces lift for a section of the aircraft other than the main wings of the aircraft. For example, the resilient skin may produce lift for a tail of an aircraft that includes one or more tail surfaces. The resilient skin may be strategically located on the aircraft to produce lift for the section of the aircraft that may require enhanced lift capabilities. Additionally or alternatively, the example resilient skin disclosed herein may be fixed in position, shape, and/or size. For example, the resilient skin may be consistently deployed for a duration of flight operation activities.

In some example VLE apparatus disclosed herein, an air wall or air fence structure is coupled to the fuselage of a highly-swept wing aircraft. The material of the air wall surface may include a composite material, a metallic material, a plastic material, etc. The air wall may be operatively coupled to a hinge via an actuator (e.g., a cam actuator, a rotary actuator, etc.). When deployed, the actuator may enable the air wall to move from a stowed position to a deployed position. The stowed position may be a position where the air wall does not project above the surface of the fuselage of the aircraft. The deployed position may be a position where the air wall projects above the surface of the fuselage of the aircraft. One or more air walls may be utilized. For example, there may be two air walls on the fuselage, with one air wall on each side of the fuselage. The surface of the air wall(s) may alter oncoming airflow. By altering the oncoming airflow, the air wall(s) may direct the leading-edge vortex above the fuselage spanwise along the leading-edge of the highly-swept wing aircraft. By altering the leading-edge vortex, the air wall(s) may enhance an amount of lift the highly-swept wing aircraft may generate. In some examples, the air wall(s) produce lift for a section of the aircraft other than the main wings of the aircraft. For example, the air wall(s) may produce lift for a tail of an aircraft that includes one or more tail surfaces. The air wall(s) may be strategically located on the aircraft to produce lift for the section of the aircraft that may require enhanced lift capabilities. Additionally or alternatively, the example air wall disclosed herein may be fixed in position, shape, and/or size. For example, the air wall may be consistently deployed for a duration of flight operation activities.

Figure 1B:
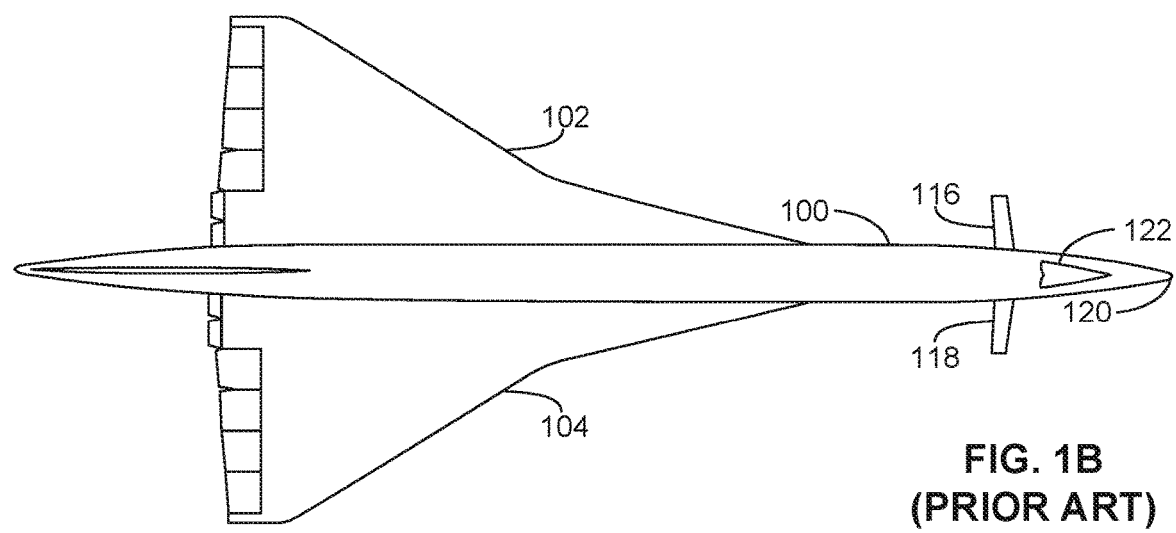

Turning to FIGS. 1A and 1B, schematic illustrations of the Russian Tupolev Tu-144D aircraft 100 are depicted. FIG. 1A is an isometric view of the aircraft 100 and FIG. 1B is a plan view from above the aircraft 100. The aircraft 100 includes two wings 102,104 coupled to a fuselage 106. The wings 102,104 include elevons 108,110 that combine the functions of the elevator (used for pitch control) and the aileron (used for roll control). The elevons 108,110 also control the angle of attack and the lift of the swept wings 102,104. The aircraft 100 further includes a rudder 112 operatively coupled to a vertical stabilizer 114 that is coupled to the fuselage 106. The vertical stabilizer 114 is a fixed wing section that provides stability for the aircraft 100 by preventing side-to-side, or yawing motion of a nose 120 of the aircraft 100. The rudder 112 is a small moving section at the rear of the vertical stabilizer 114 that generates and controls the yawing motion of the aircraft.

In the illustrated example of FIG. 1, the aircraft 100 includes two canards 116,118 operatively coupled to the fuselage 106 above the nose 120 of the aircraft 100. The canards 116,118 are located adjacent and behind a cockpit 122. The canards 116,118 are retractable to a stowed position after a take-off or landing operation has been completed. In some examples, the canards 116,118 are stowed during the cruising portion of the flight to reduce drag. In some instances, the canards 116,118 are deployed during a landing operation to enhance vehicle lift-to-drag ratio. For example, the canards 116,118 are deployed during a landing operation to improve maneuverability and control by adding an additional control surface. The wing configuration of the aircraft 100 results in higher approach speeds, which led to the addition of the canards 116,118 to enable lower approach speeds through an increase in vehicle lift-to-drag ratio. Deployment of the canards 116,118 can further reduce approach speeds by providing the pitch trim authority to enable higher wing flap deflections of the elevons 108,110. The canards 116,118 were added to the aircraft 100 to improve control at low speeds and not to extend a leading-edge vortex spanwise along the leading-edge of the wings 102,104. The canards are optimally designed to not disrupt or change flow over the wings 102,104.

Figure 2:
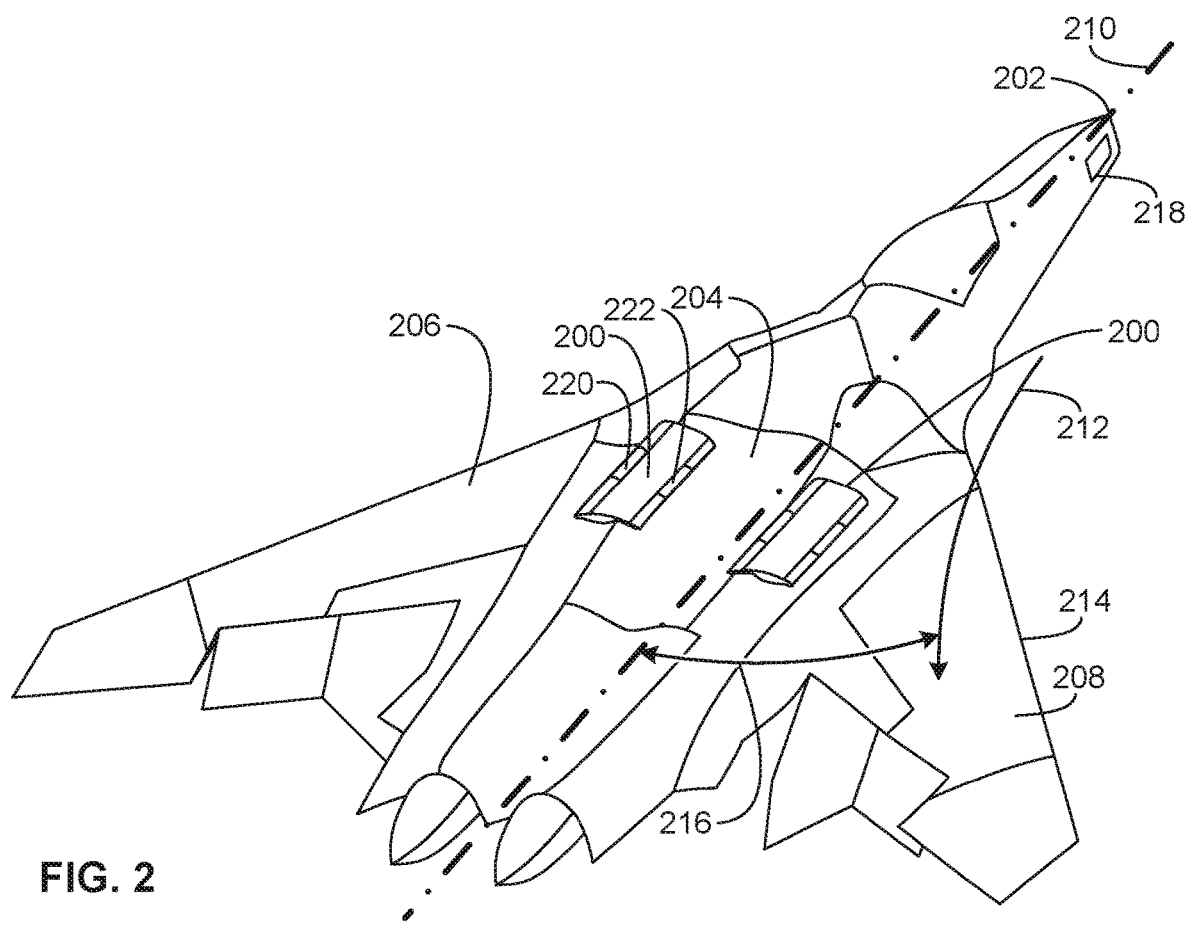
FIG. 2 is a schematic illustration of an example vortex lift enhancer apparatus including an example shoulder wing apparatus coupled to an example aircraft in a stowed position in accordance with the teachings of this disclosure.

FIG. 2 is a schematic illustration of an example VLE apparatus 200 coupled to an example highly-swept wing aircraft 202. In the illustrated example, the VLE apparatus 200 is a shoulder wing apparatus in the stowed position. The example VLE apparatus 200 is operatively coupled to a fuselage 204 and is located above wings 206,208 of the aircraft 202. In the stowed position, the example VLE apparatus 200 is in a longitudinal orientation with respect to an axis 210 of the aircraft 202. The wings 206,208 may cause a formation of a leading-edge vortex. For example, the wings 206,208 may cause the formation of a leading-edge vortex 212 along a leading-edge 214 of the wing 208. Although only one example leading-edge vortex is shown, additional leading-edge vortices may form above the wings 206,208 and may be altered and/or adjusted by the VLE apparatus 200 as described below. The example leading-edge vortex 212 may form at an angle 216 with respect to the axis 210 of the aircraft 202. In some examples, the example VLE apparatus 200 may remain in the stowed position based on a measurement of a sensor 218. For example, the VLE apparatus 200 may remain stowed in response to determining that an altitude measurement and/or a speed measurement as measured by the sensor 218 do not satisfy a threshold (e.g., an altitude measurement exceeds a maximum altitude threshold, a speed measurement exceeds a maximum speed threshold, etc.).

In the illustrated example of FIG. 2, slats 220 are operatively coupled to the VLE apparatus 200 in the stowed position. While the example VLE apparatus 200 is in the stowed position, the slats 220 also remain in the stowed position. Flaps 222 are also operatively coupled to the example VLE apparatus 200 in the stowed position. The flaps 222 remain in the stowed position while the example VLE apparatus 200 remains in the stowed position.

Figure 3:
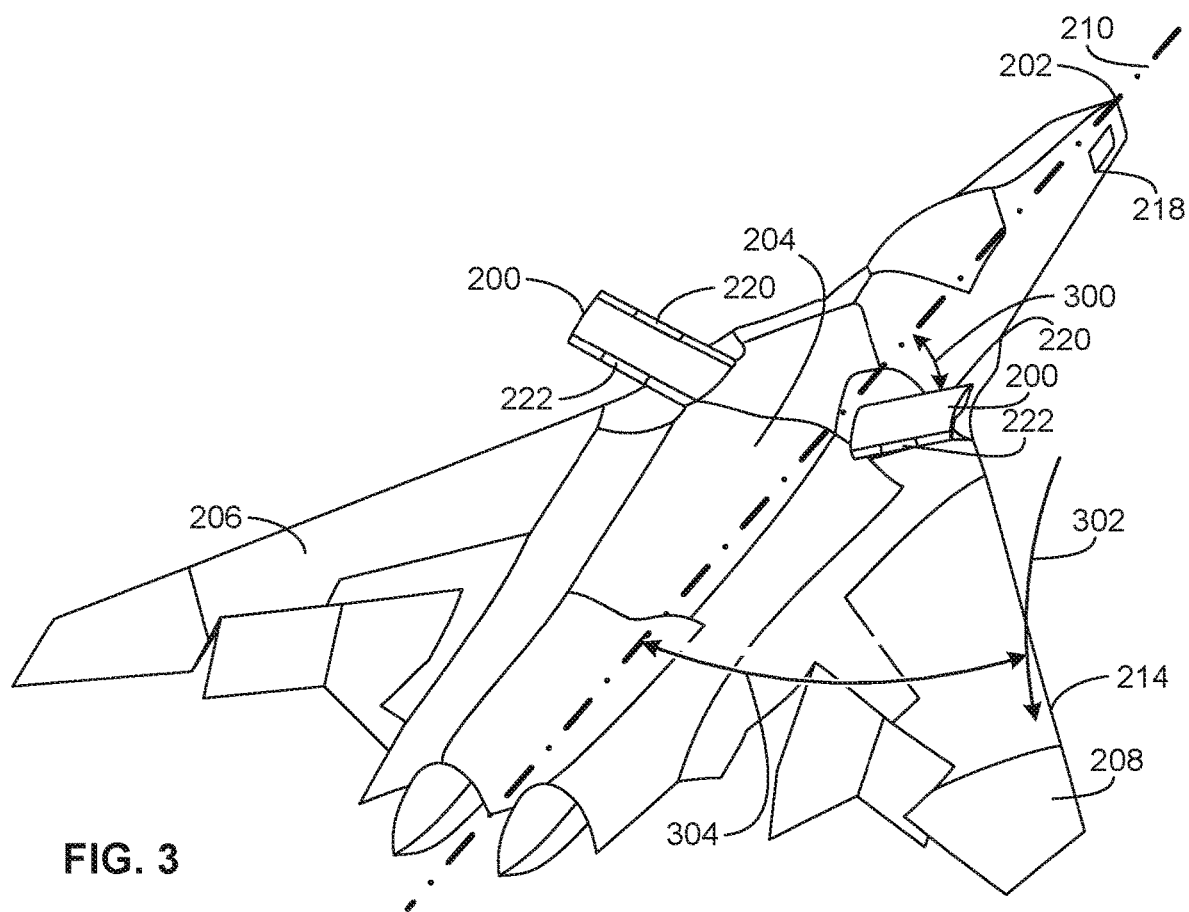
FIG. 3 is a schematic illustration of the example vortex lift enhancer apparatus including the example shoulder wing apparatus coupled to the example aircraft in a deployed position in accordance with the teachings of this disclosure.

FIG. 3 is a schematic illustration of the example VLE apparatus 200 of FIG. 2 coupled to the example highly-swept wing aircraft 202 of FIG. 2 while in the deployed position. The example VLE apparatus 200 is operatively coupled to the fuselage 204 above the wings 206,208 of the aircraft 202. In the deployed position, the example VLE apparatus 200 is located at an angle 300 with respect to the axis 210 of the aircraft 202. The deployment of the example VLE apparatus 200 may alter a leading-edge vortex formed by the wings 206,208. For example, the deployment of the VLE apparatus 200 adjusts a leading-edge vortex 302 to move spanwise along the leading-edge 214 of the wing 208. The example VLE apparatus 200 may adjust the example leading-edge vortex 302 to an angle 304 with respect to the axis 210 of the aircraft 202. In the illustrated example, the angle 304 with respect to the axis 210 is different than the angle 216 of FIG. 2 with respect to the axis 210 because of the deployment of the VLE apparatus 200. The adjustment of the leading-edge vortex 302 at the angle 304 with respect to the axis 210 is proximate to an optimal location of the leading-edge vortex 302. For example, the optimal location of the leading-edge vortex 302 (e.g., the location that optimizes an aerodynamic property of the aircraft) may be at an angle with respect to the axis 210, where the leading-edge vortex 302 is approximately parallel to the leading-edge 214 of the aircraft 202.

In the illustrated example of FIG. 3, the VLE apparatus 200 is in the deployed position based on a measurement of the sensor 218. For example, the VLE apparatus 200 may move from the stowed position to the deployed position in response to determining that an altitude measurement and/or a speed measurement as measured by the sensor 218 satisfies a threshold (e.g., an altitude measurement is less than a maximum altitude threshold, a speed measurement is less than a maximum speed threshold, etc.). In some examples, the VLE apparatus 200 may move from the stowed position to the deployed position via a VLE actuator as described below in accordance with FIG. 5.

In the illustrated example of FIG. 3, the slats 220 of FIG. 2 and the flaps 222 of FIG. 2 are operatively coupled to the VLE apparatus 200. The slats 220 and the flaps 222 are in the stowed position. The slats 220 and the flaps 222 may remain in the stowed position based on a measurement of the sensor 218. For example, the VLE apparatus 200 may determine that an amount of lift generated by the combination of the VLE apparatus 200 and the wings 206,208 is sufficient based on an altitude measurement, an angle of attack measurement, a speed measurement, etc. of the sensor 218.

Figure 4:
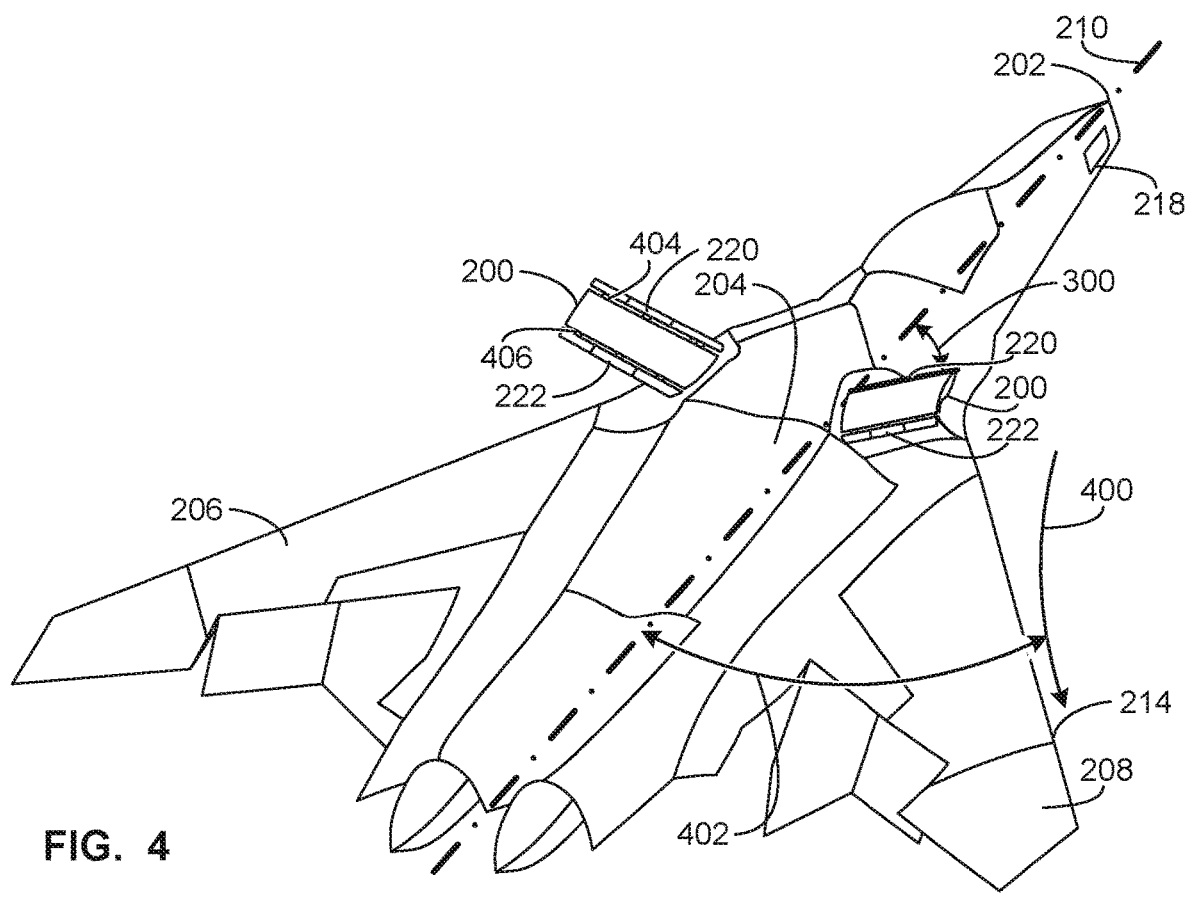
FIG. 4 is a schematic illustration of the example vortex lift enhancer apparatus including the example shoulder wing apparatus coupled to the example aircraft in the deployed position with deployed flaps and slats in accordance with the teachings of this disclosure.

FIG. 4 is a schematic illustration of the example VLE apparatus 200 of FIGS. 2-3 coupled to the example highly-swept wing aircraft 202 of FIGS. 2-3 while in the deployed position. The example VLE apparatus 200 is operatively coupled to the fuselage 204 above the wings 206,208 of the aircraft 202. In the deployed position, the example VLE apparatus 200 is located at the angle 300 of FIG. 3 with respect to the axis 210 of the aircraft 202. In the illustrated example, the VLE apparatus 200 is in the deployed position; however, the slats 220 and the flaps 222 have been deployed to adjust an example leading-edge vortex 400 to move spanwise along the leading-edge 214 of the wing 208. The deployment of the example VLE apparatus 200 in combination with the deployment of the slats 220 and the flaps 222 may adjust the example leading-edge vortex 400 to an angle 402 with respect to the axis 210 of the aircraft 202.

In the illustrated example of FIG. 4, the slats 220 are operatively coupled to the VLE apparatus 200 via slat actuators 404. The slats 220 are aerodynamic surfaces used to prevent the leading-edge 214 of the wing 208 from stalling prematurely. For example, the slats 220 may be actuated to move from a first position to a second position via a processor. The processor may determine that the slats 220 require a position adjustment in response to a change in an obtained parameter such, as for example, airspeed, altitude, pilot action, etc. In the illustrated example, the slats 220 are in the deployed position. Although all the slats 220 are depicted in a deployed position in FIG. 4, one or more slats 220 may alternatively be in a stowed position while the remaining slats 220 are in the deployed position. In some examples, the slats 220 may be collectively actuated. In some instances, the slats 220 may be individually actuated.

In the illustrated example of FIG. 4, the flaps 222 are operatively coupled to the VLE apparatus 200 via flap actuators 406. The flaps 222 are aerodynamic surfaces on the trailing edge of the example VLE apparatus 200 that may be adjusted to increase the lift of the wings 206,208 at a given airspeed. For example, the flaps 222 may be actuated to move from a first position to a second position via the processor. The processor may determine that the flaps 222 require a position adjustment in response to a change in an obtained parameter such as, for example, airspeed, altitude, pilot action, slat status, etc., where the slat status may include whether one or more slats is in a deployed position, a stowed position or an intermediate position. In the illustrated example, the flaps 222 are in the deployed position. Although all the flaps 222 are depicted in a deployed position in FIG. 4, one or more flaps 222 may be in a stowed position while the remaining flaps 222 are in the deployed position. In some examples, the flaps 222 may be collectively actuated. In some instances, the flaps 222 may be individually actuated.

In the illustrated example of FIG. 4, the positions of the slats 220 and/or the flaps 222 are adjusted in response to a flight action of the aircraft 202 such as, for example, a deployment of landing gear. In some instances, the VLE apparatus 200 adjusts the position of the slats 220 and/or the flaps 222 to different positions in response to a change in a flight condition of the aircraft 202 such as, for example, an airspeed of the aircraft 202 falling below a threshold, an altitude of the aircraft 202 falling below a threshold, etc. The slats 220 and/or the flaps 222 may be in the stowed position, the deployed position, or an intermediate position based on a measurement of the sensor 218. For example, the VLE apparatus 200 may determine that an amount of lift generated by the VLE apparatus 200 and/or the wings 206,208 is not sufficient based on an altitude measurement, an angle of attack measurement, a speed measurement, etc. obtained by the sensor 218. The example VLE apparatus 200 may determine that the slats 220 and/or the flaps 222 are to be deployed to enhance the amount of lift being generated by the VLE apparatus 200 and the wings 206,208. In the illustrated example, the angle 402 with respect to the axis 210 is different than the angle 304 of FIG. 3 with respect to the axis 210 because of the deployment of the slats 220 and/or the flaps 222.

Figure 5:
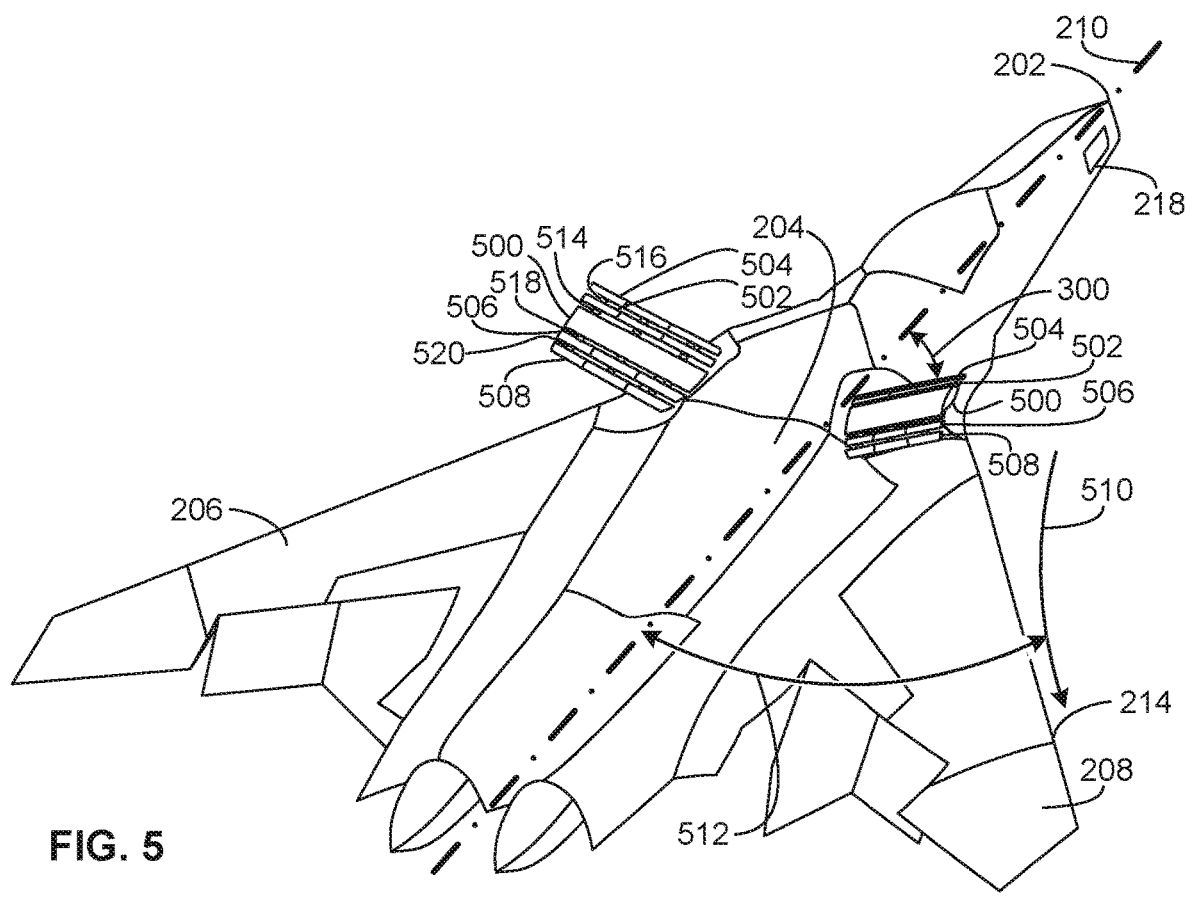
FIG. 5 is a schematic illustration of another example vortex lift enhancer apparatus including an example shoulder wing apparatus coupled to the example aircraft in the deployed position with multiple deployed flaps and slats in accordance with the teachings of this disclosure.

FIG. 5 is a schematic illustration of an example VLE apparatus 500 coupled to the example highly-swept wing aircraft 202 of FIGS. 2-4 while in the deployed position. In the illustrated example, the VLE apparatus 500 is a shoulder wing apparatus. The example VLE apparatus 500 is operatively coupled to the fuselage 204 above the wings 206,208 of the aircraft 202. In the deployed position, the example VLE apparatus 500 is located at the angle 300 of FIGS. 3-4 with respect to the axis 210 of the aircraft 202. In the illustrated example, the VLE apparatus 500 is in the deployed position. Slats 502,504 and flaps 506,508 have been deployed to adjust an example leading-edge vortex 510 to move spanwise along the leading-edge 214 of the wing 208. The deployment of the example VLE apparatus 500 in combination with the deployment of the slats 502,504 and the flaps 506,508 may adjust the example leading-edge vortex 510 to an angle 512 with respect to the axis 210 of the aircraft 202.

In the illustrated example of FIG. 5, the slats 502,504 are operatively coupled to the example VLE apparatus 500 via slat actuators 514,516. The slats 502,504 are aerodynamic surfaces used to prevent the leading-edge 214 of the wing 208 from stalling prematurely. For example, the slats 502, 504 may be actuated to move from a first position to a second position via a processor. The processor may determine that the slats 502,504 require a position adjustment in response to a change in an obtained parameter such, as for example, airspeed, altitude, pilot action, etc. In the illustrated example, the slats 502,504 are in the deployed position. Although all the slats 502,504 are depicted in a deployed position in FIG. 5, one or more slats 502,504 may alternatively be in a stowed position while the remaining slats 502,504 are in the deployed position. In some examples, the slats 502,504 may be collectively actuated. In some instances, the slats 502,504 may be individually actuated.

In the illustrated example of FIG. 5, the flaps 506,508 are operatively coupled to the example VLE apparatus 500 via flap actuators 518,520. The flaps 506,508 are aerodynamic surfaces on the trailing edge of the example VLE apparatus 500 that may be adjusted to increase the lift of the wings 206,208 at a given airspeed. For example, the flaps 506,508 may be actuated to move from a first position to a second position via the processor. The processor may determine that the flaps 506,508 require a position adjustment in response to a change in an obtained parameter such as, for example, airspeed, altitude, pilot action, slat status, etc., where the slat status may include whether one or more slats is in a deployed position, a stowed position, or an intermediate position. In the illustrated example, the flaps 506,508 are in the deployed position. Although all the flaps 506,508 are depicted in a deployed position in FIG. 5, one or more flaps 506,508 may be in a stowed position while the remaining flaps 506,508 are in the deployed position. In some examples, the flaps 506,508 may be collectively actuated. In some instances, the flaps 506,508 may be individually actuated.

In the illustrated example of FIG. 5, the positions of the slats 502,504 and/or the flaps 506,508 are adjusted in response to a flight action of the aircraft 202 such as, for example, a deployment of landing gear. In some instances, the VLE apparatus 500 adjusts the position of the slats 502,504 and/or the flaps 506,508 to different positions in response to a change in a flight condition of the aircraft 202 such as, for example, an airspeed of the aircraft 202 falling below a threshold, an altitude of the aircraft 202 falling below a threshold, etc. The slats 502,504 and/or the flaps 506,508 may be in the stowed position, the deployed position, or an intermediate position based on a measurement of the sensor 218. For example, the VLE apparatus 500 may determine that an amount of lift generated by the VLE apparatus 500 and/or the wings 206,208 is not sufficient based on an altitude measurement, an angle of attack measurement, a speed measurement, etc. obtained by the sensor 218. The example VLE apparatus 500 may determine that the slats 502,504 and/or the flaps 506,508 are to be deployed to enhance the amount of lift being generated by the VLE apparatus 500 and the wings 206,208.

FIG. 6A is a schematic illustration of the example VLE apparatus 200,500 of FIGS. 2-5 operatively coupled to the example highly-swept wing aircraft 202 of FIGS. 2-5 while in the deployed position. The example VLE apparatus 200,500 is operatively coupled to the fuselage 204 above the wings 206,208 of the aircraft 202 via an example VLE actuator apparatus 600. Although only one example VLE actuator apparatus 600 is depicted, there are two installed on the aircraft 202, where one VLE actuator apparatus 600 is installed on each side of the aircraft 202. For clarity purposes, only one example VLE actuator apparatus 600 will be discussed below; however, the details apply to both VLE actuator apparatus 600.

FIG. 6B is a detailed view of the example VLE actuator apparatus 600 operatively coupled to the example VLE apparatus 200,500 of FIGS. 2-5. In FIG. 6B for clarity purposes, the detailed view depicts the example VLE apparatus 200,500 operatively coupled to the example VLE actuator apparatus 600 detached from the aircraft 202. The example VLE actuator apparatus 600 utilizes a canted hinge 602 to adjust a position of the VLE apparatus 200,500. The example VLE actuator apparatus 600 includes a mounting faceplate 604 that enables the VLE actuator apparatus 600 to be mounted to the aircraft 202.

FIG. 6C is a detailed view of the example VLE actuator apparatus 600 operatively coupled to the example VLE apparatus 200 installed on the aircraft 202. The example VLE actuator apparatus 600 is installed on the aircraft 202 via the mounting faceplate 604 coupled to a mounting interface 606. The example VLE actuator apparatus 600 includes an actuator 608 coupled to the mounting faceplate 604. The mounting faceplate 604 is coupled to a fitting 610 that allows for an insertion of a pivot pin 612. In the illustrated example, the VLE apparatus 200,500 may move from a deployed position (e.g., a position at an angle 300 from the axis 210) to a stowed position (e.g., a position at an angle parallel to the axis 210) in a clockwise direction 614.

In the illustrated example of FIG. 6C, the VLE actuator apparatus 600 enables position of the VLE apparatus 200, 500 to be adjusted when actuated. In some examples, a processor causes an actuation of the VLE actuator apparatus 600. For example, the processor may determine that the VLE apparatus 200,500 position requires adjustment. The processor may then actuate the example VLE actuator apparatus 600 via a motor (e.g., a servo motor) and/or an additional actuator (e.g., an electric actuator, a hydraulic actuator, etc.). In some instances, the VLE apparatus 200,500 is stowed in a VLE apparatus housing as described below in FIGS. 7-9. The example VLE apparatus 200,500 may move in coordination with the opening or closing of the VLE apparatus housing. For example, the VLE apparatus 200,500 may move from a stowed position to a deployed position while simultaneously the VLE apparatus housing moves from a closed position to an open position.

Figure 7:
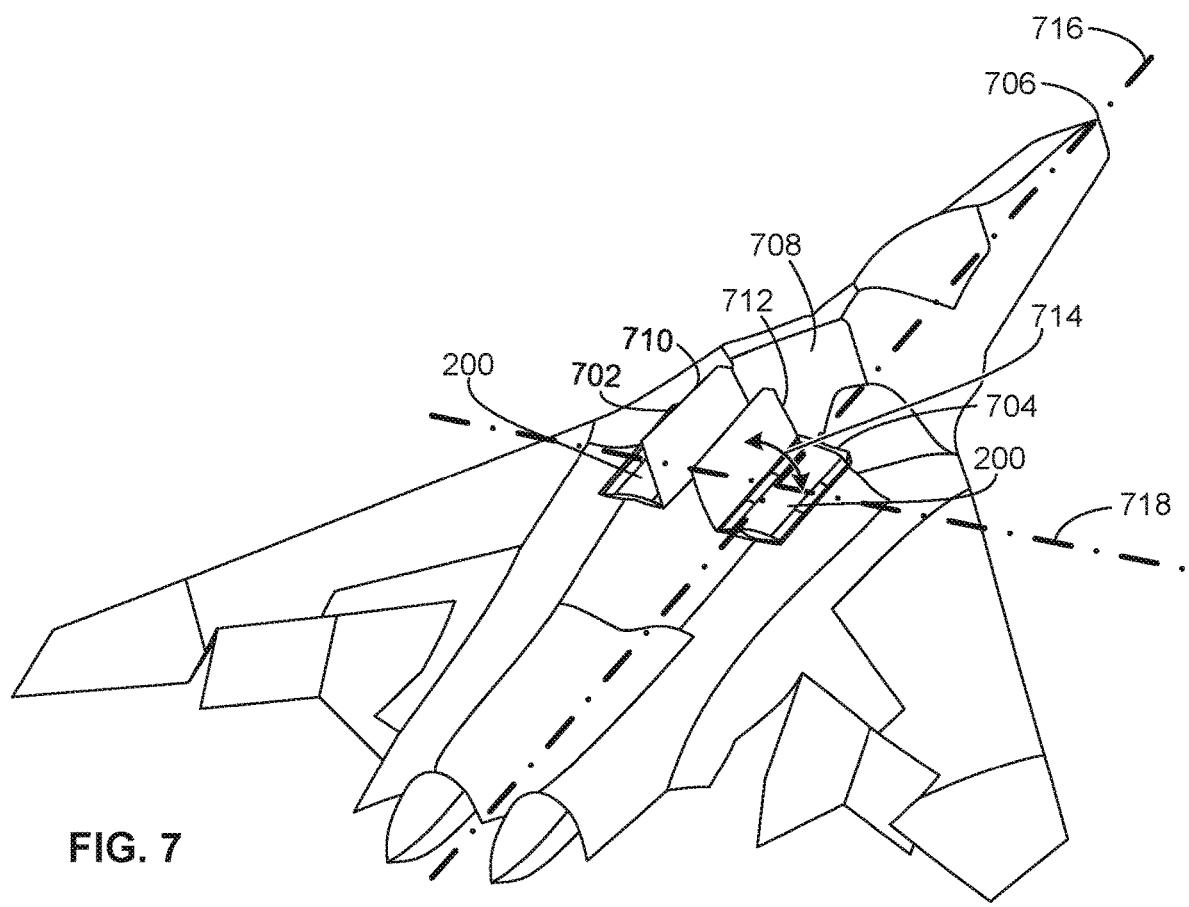
FIG. 7 is a schematic illustration of yet another example vortex lift enhancer apparatus including an example shoulder wing apparatus in the stowed position in a shoulder wing housing where the shoulder wing housing doors are open in accordance with the teachings of this disclosure.

FIG. 7 depicts the example VLE apparatus 200 in example VLE apparatus housings 702,704 of a highly-swept wing aircraft 706. The example VLE apparatus housings 702,704 are embedded within a fuselage 708 of the aircraft 706. The example VLE apparatus housings 702,704 are enclosed by housing doors 710,712. Although there are two VLE apparatus housings 702,704 and two housing doors 710,712 shown in FIG. 7, an alternative example may have a single VLE apparatus housing with one or more housing doors. In the illustrated example, the VLE apparatus 200 is enclosed in the VLE apparatus housings 702,704 to improve aerodynamic properties of the aircraft 706. Encapsulating the example VLE apparatus 200 within the example VLE apparatus housings 702,704 may reduce drag on the aircraft 706 during aircraft operations that do not require the VLE apparatus 200 to be deployed.

In the illustrated example of FIG. 7, the example VLE apparatus 200 is in the stowed position while the housing doors 710,712 are in the open position. The stowed position is at an angle approximately parallel to a longitudinal axis 716 of the aircraft 706. The open position is at an angle 714 with respect to an axis 718 that is perpendicular to the longitudinal axis 716. The housing doors 710,712 may be in the open position in preparation for the example VLE apparatus 200 to move from the stowed position to the deployed position. The housing doors 710,712 may also be in the open position in preparation for the example VLE apparatus 200 to move from the deployed position to the stowed position.

Figure 8:
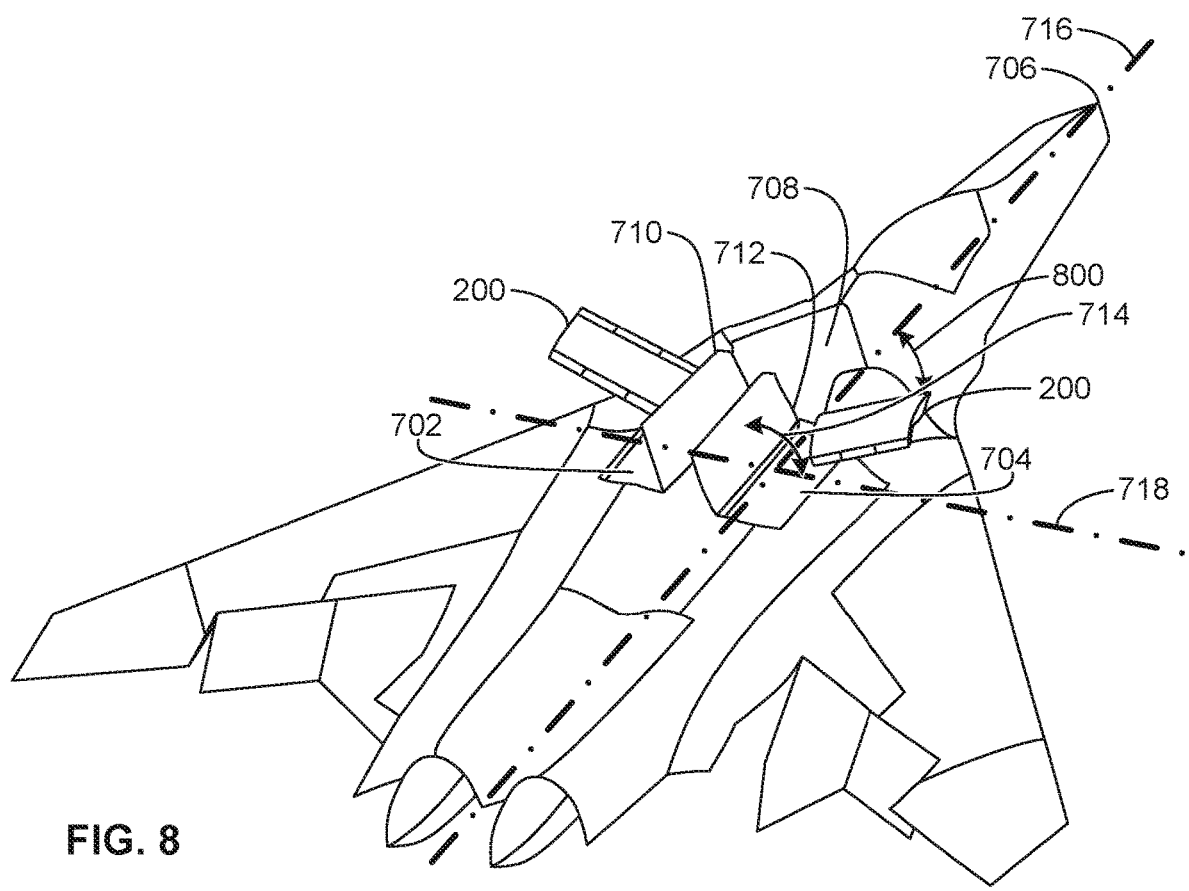
FIG. 8 is a schematic illustration of the yet another example vortex lift enhancer apparatus including the example shoulder wing apparatus in the deployed position where the shoulder wing housing doors are open in accordance with the teachings of this disclosure.

FIG. 8 depicts the example VLE apparatus 200 in an intermediate position between the stowed position and the deployed position and the housing doors 710,712 in the open position. In the illustrated example, the intermediate position is at an angle 800 with respect to the longitudinal axis 716. The intermediate position may be reached when the example VLE apparatus 200 is moving from the stowed position to the deployed position. For example, the example VLE apparatus 200 may move from the stowed position to the intermediate position prior to a landing operation. Prior to the movement of the example VLE apparatus 200, the housing doors 710,712 may be moved from the closed position (e.g., the position at the angle parallel to the longitudinal axis 716) to the open position (e.g., the position at the angle 714 with respect to the axis 718) via one or more housing door actuators. In some examples, the VLE apparatus 200 moves from the stowed position to the intermediate position after the housing doors 710,712 have moved from the closed position to the open position. In some instances, the VLE apparatus 200 moves from the stowed position to the intermediate position simultaneously as the housing doors 710,712 move from the closed position to the open position.

In some examples, the intermediate position may be reached when the example VLE apparatus 200 is moving from the deployed position to the stowed position. For example, the example VLE apparatus 200 may move from the deployed position to the intermediate position after a take-off operation. Prior to the movement of the example VLE apparatus 200, the housing doors 710,712 may be moved from the closed position (e.g., the position at the angle parallel to the longitudinal axis 716) to the open position (e.g., the position at the angle 714 to the axis 718) via the one or more housing door actuators. In some examples, the VLE apparatus 200 moves from the deployed position to the intermediate position after the housing doors 710,712 have moved from the closed position to the open position. In some instances, the VLE apparatus 200 moves from the deployed position to the intermediate position simultaneously as the housing doors 710,712 move from the closed position to the open position.

Figure 9:
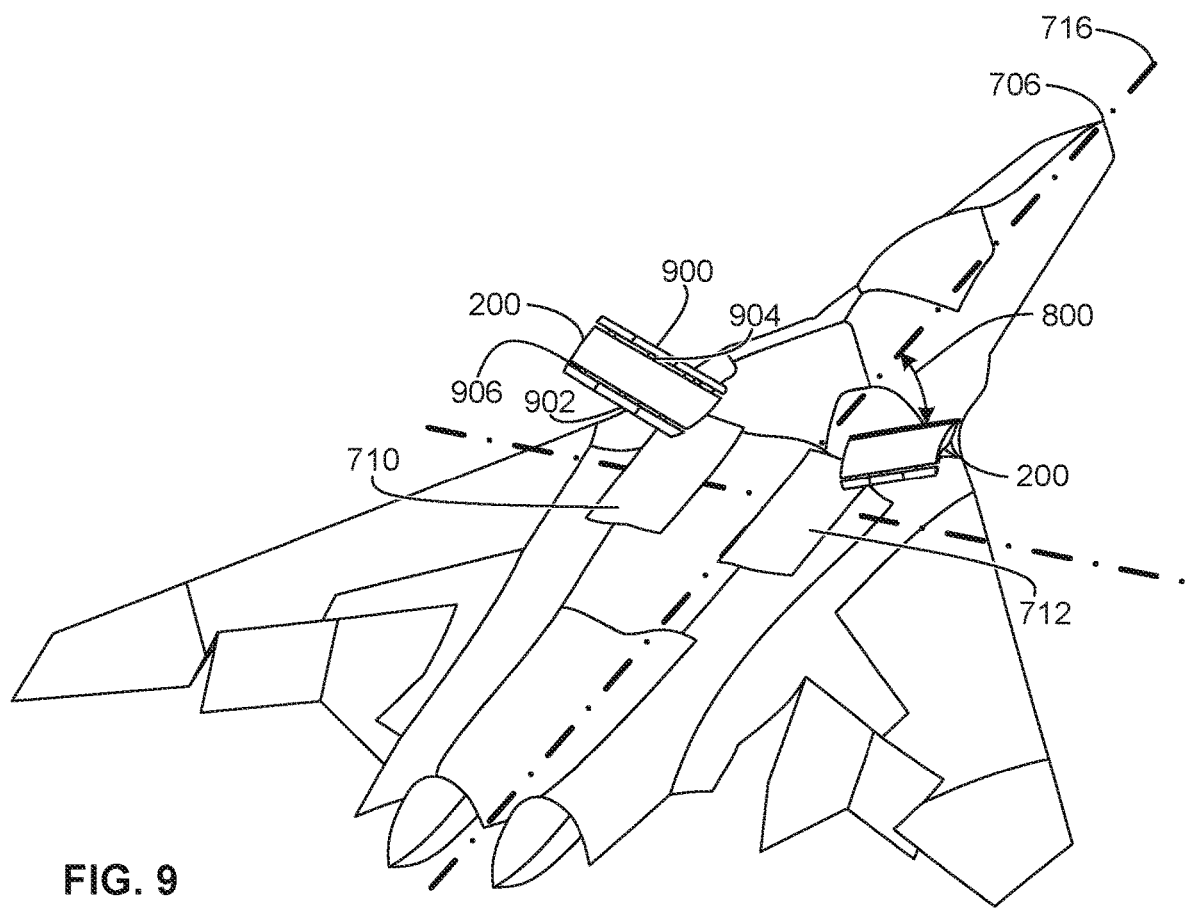
FIG. 9 is a schematic illustration of the yet another example vortex lift enhancer apparatus including the example shoulder wing apparatus in the deployed position with deployed flaps and slats and where the shoulder wing housing doors are closed in accordance with the teachings of this disclosure.

FIG. 9 depicts the example VLE apparatus 200 in the deployed position and the housing doors 710,712 in the closed position. The example VLE apparatus 200 is located at the angle 800 with respect to the longitudinal axis 716 of the aircraft 706. In the illustrated example, the aircraft 706 may be performing a take-off or a landing operation. During the take-off operation or the landing operation, the housing doors 710,712 are in the closed position. The housing doors 710,712 in the open position during the take-off operation or the landing operation may produce undesirable aerodynamic effects of the flight capabilities of the aircraft 706 (e.g., decrease lift of the aircraft 706, increase drag of the aircraft 706, etc.). In some examples, the example VLE apparatus 200 may use a position of the housing doors 710,712 to determine a position of slats 900 and flaps 902 coupled to the VLE apparatus 200. For example, the VLE apparatus 200 may adjust the position of the slats 900 and the flaps 902 in response to determining that the housing doors 710,712 are in the closed position. In some examples, the VLE apparatus 200 may adjust the slats 900 from the stowed position to the deployed position via slat actuators 904. In some instances, the VLE apparatus 200 may adjust the flaps 902 from the stowed position to the deployed position via flap actuators 906.

Figure 10:
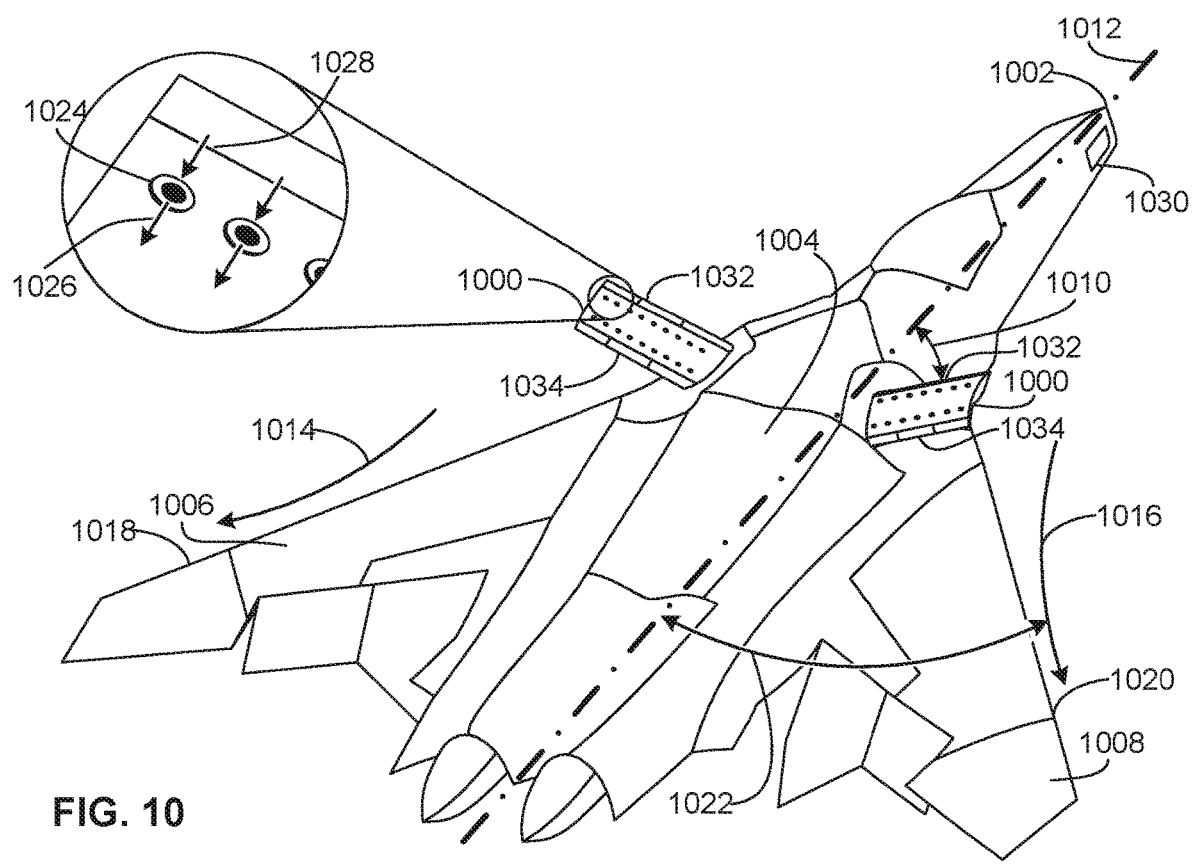
FIG. 10 is a schematic illustration of an example vortex lift enhancer apparatus including an example shoulder wing apparatus in the deployed position including perforations in accordance with the teachings of this disclosure.

FIG. 10 is a schematic illustration of another example VLE apparatus 1000. In the illustrated example, the VLE apparatus 1000 is a shoulder wing apparatus in the deployed position. The example VLE apparatus 1000 is operatively coupled to a fuselage 1004 above wings 1006,1008 of an aircraft 1002. In the deployed position, the example VLE apparatus 1000 is located at an angle 1010 with respect to an axis 1012 of the aircraft 1002. In the illustrated example, the deployment of the VLE apparatus 1000 adjusts leading-edge vortices 1014,1016 to move spanwise along leading-edges 1018,1020 of the wings 1006,1008. For example, the example VLE apparatus 1000 may adjust the leading-edge vortex 1016 to an angle 1022 with respect to the axis 1012 of the aircraft 1002.

In the illustrated example of FIG. 10, the VLE apparatus 1000 further includes perforations 1024 (e.g., air jets) to cause an expulsion and/or a suction of air to extend the leading-edge vortices 1014,1016 spanwise along the leading-edges 1018,1020 of the wings 1006,1008 of the aircraft 1002 via flow control (e.g., active flow control). For example, the perforations 1024 may be individually connected to respective valves or collectively connected to one or more valves via pneumatic tubes that may be actuated via an actuator (e.g., a zero-mass-flux (ZMF) actuator, a piezo-electric actuator, etc.) to enable the expulsion of air or the suction of air. In some examples, the one or more valves may be actuated to connect an air supply to the perforations 1024 to enable an expulsion of pressurized air through the perforations 1024. For example, the valve(s) may be actuated to enable the perforations 1024 to expel air in a direction 1026 to disrupt, enhance, or redirect the flow of air over the wings 1006,1008 of the aircraft 1002. In some instances, the valve(s) may be actuated to connect a suction mechanism (e.g., a vacuum) to the perforations 1024 to enable the suction of air in a direction 1028 through the perforations 1024. For example, the valve(s) may be actuated to enable the perforations 1024 to pull in the boundary layer airflow via suction to improve flow attachment on the wings 1006, 1008. Pulling in the boundary layer airflow may enable improved flow attachment and prevent flow separation, increasing the performance of the shoulder wing apparatus 1000.

In the illustrated example of FIG. 10, the perforations 1024 may extend the coherence of the leading-edge vortices 1014,1016 to prevent premature bursting of the leading-edge vortices 1014,1016. In some examples, allowing the oncoming airflow to force the path of the vortices more along the axis 1012 of the fuselage 1004 may cause the loss of formation and/or the weakening of the leading-edge vortices 1014,1016 to a point where the leading-edge vortices 1014, 1016 prematurely burst. The bursts of the leading-edge vortices 1014,1016 reduce performance of the aircraft 1002. By re-directing the oncoming airflow away from the axis 1012 (e.g., moving the oncoming airflow spanwise along the leading-edges 1018,1020), the example VLE apparatus 1000 may maintain and/or strengthen the coherence of the leading-edge vortices 1014,1016 for an extended period of time. For example, the perforations 1024 may cause the expulsion of air in the direction 1026 to reinforce the spanwise airflow along the leading-edges 1018,1020 of the wings 1006,1008. The example VLE apparatus 1000 thus delays the leading-edge vortex burst and effectively increases vehicle lift-to-drag ratio (e.g., increasing an amount of lift greater than an amount of drag) of the aircraft 1002.

In the illustrated example of FIG. 10, the perforations 1024 may be actuated based on a measurement of a sensor 1030. For example, the VLE apparatus 1000 may enable the perforations 1024 to expel and/or pull in air in response to determining that an altitude measurement and/or a speed measurement as measured by the sensor 1030 satisfies a threshold (e.g., an altitude measurement is less than a maximum altitude threshold, a speed measurement is less than a maximum speed threshold, etc.). In some examples, the VLE apparatus 1000 may enable one or more perforations 1024 to expel air and/or other pressurized gas while enabling the remaining perforations 1024 to pull in the boundary layer airflow via suction.

In the illustrated example of FIG. 10, the VLE apparatus 1000 further includes slats 1032 and flaps 1034 operatively coupled to the VLE apparatus 1000. In the illustrated example, the slats 1032 and the flaps 1034 are in the stowed position. The slats 1032 and the flaps 1034 may remain in the stowed position based on the measurement of the sensor 1030. For example, the VLE apparatus 1000 may determine that an amount of lift generated by the wings 1006,1008 and enhanced by the VLE apparatus 1000 is sufficient based on an altitude measurement, an angle of attack measurement, a speed measurement, etc. of the sensor 1030. In some examples, the VLE apparatus 1000 may determine that the amount of lift generated by the wings 1006,1008 and enhanced by the VLE apparatus 1000 is not sufficient based on the altitude measurement, the angle of attack measurement, the speed measurement, etc. of the sensor 1030. The example VLE apparatus 1000 may determine to move the slats 1032 and the flaps 1034 from the stowed position to the deployed position based on the measurements from the sensor 1030.

Figure 11A:
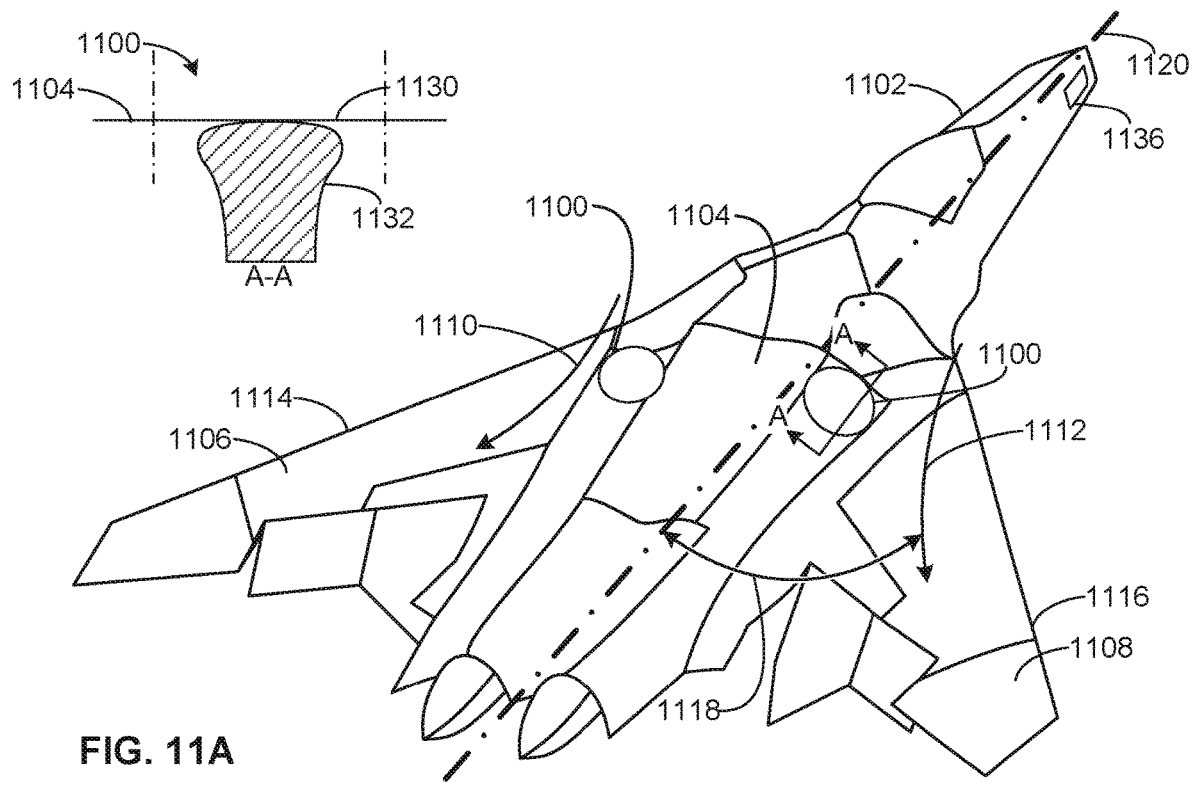
FIGS. 11A and 11B depict another example vortex lift enhancer apparatus in a stowed position and a deployed position.
Figure 11B:
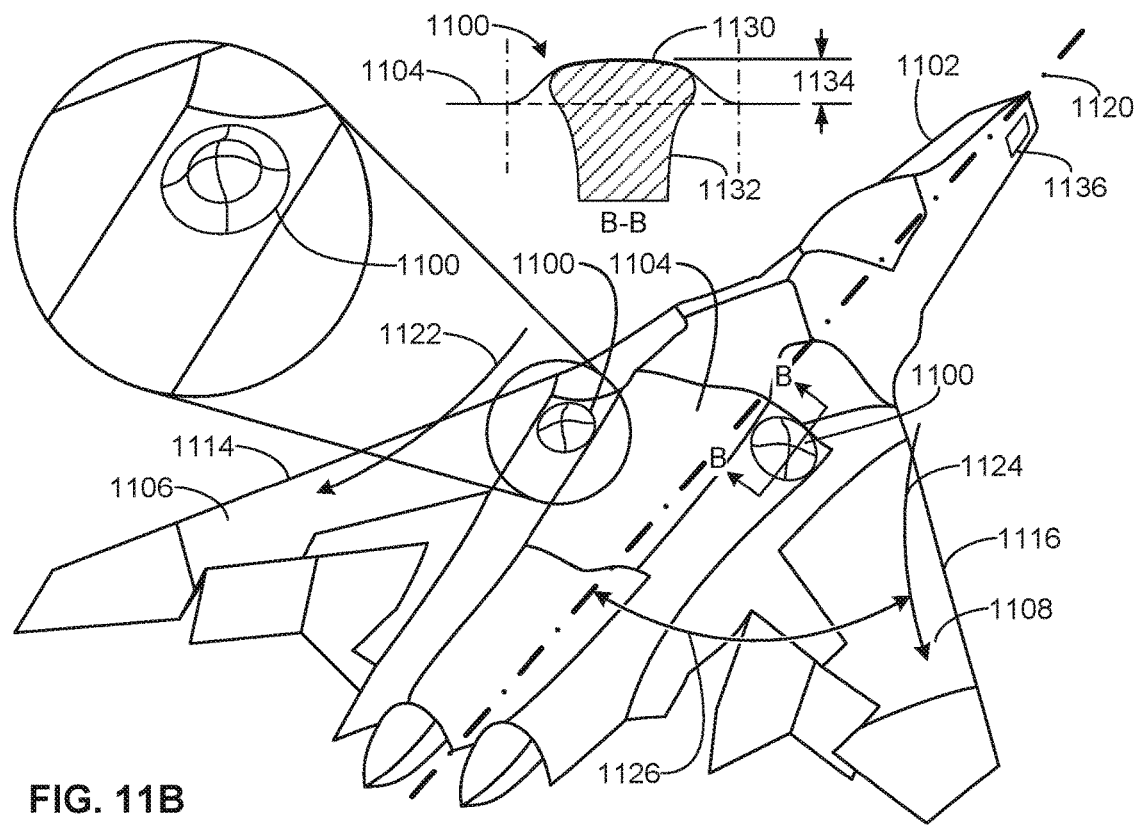

FIGS. 11A and 11B depict yet another example of a VLE apparatus 1100. In the illustrated example, the VLE apparatus 1100 is an elastic skin or a resilient skin such as, for example, a balloon structure, a conformal bump structure, a protuberance structure, etc. There are two example VLE apparatus 1100, one on each side of an aircraft 1102. In the illustrated example, although there are two example VLE apparatus 1100 depicted, some examples may include one or more than two VLE apparatus 1100. The descriptions and details below apply to both example VLE apparatus 1100.

In the illustrated example of FIG. 11A, the VLE apparatus 1100 is in the stowed position (e.g., non-deployed position). In the illustrated example, the VLE apparatus 1100 is operatively coupled to a portion of a fuselage 1104 above highly-swept wings 1106,1108 of the aircraft 1102. The aerodynamic effects of the wings 1106,1108 may create leading-edge vortices 1110,1112 along leading-edges 1114, 1116. For example, the wing 1108 may generate a leading-edge vortex 1112 at an angle 1118 with respect to an axis 1120 of the aircraft 1102. Viewpoint A-A depicts a side cutaway view of the VLE apparatus 1100 in the stowed position. Pliable material 1130 may include an elastic or flexible material. In some examples, the pliable material 1130 is an elastic membrane, an elastic skin, a flexible membrane, a flexible skin, etc. For example, the elastic material may be a composite material, a metallic material, and/or a plastic material. The VLE apparatus 1100 may be connected to a structure via an actuator. In the illustrated example, the VLE apparatus 1100 is operatively coupled to a plunger structure 1132. The plunger structure 1132 may push against the pliable material 1130 to form a conformal bump when the VLE apparatus 1100 is deployed. The example VLE apparatus 1100, when stowed, does not project above the surface of the fuselage 1104 and is, instead, flush with a curvature of the fuselage 1104.

In the illustrated example of FIG. 11B, the VLE apparatus 1100 is in the deployed position. The example VLE apparatus 1100 may redirect airflow above the highly-swept wings 1106,1108 of the aircraft 1102. For example, oncoming air may be re-directed spanwise along leading-edges 1114,1116 of the wings 1106,1108 when the oncoming air encounters the deployed VLE apparatus 1100. Redirecting oncoming air may alter the leading-edge vortices 1110,1112 generated by the highly-swept wings 1106,1108. For example, the deployment of the example VLE apparatus 1100 may alter the leading-edge vortices 1110,1112 into leading-edge vortices 1122,1124. For example, the example VLE apparatus 1100 may adjust the leading-edge vortex 1124 to an angle 1126 with respect to the axis 1120 of the aircraft 1102. In the illustrated examples of FIGS. 11A and 11B, the angle 1126 is greater than the angle 1118 due to the deployment of the example VLE apparatus 1100. Viewpoint B-B depicts a side cutaway view of the VLE apparatus 1100 in the deployed position. The plunger structure 1132 pushes into the pliable material 1130 to a distance 1134 above the fuselage 1104. For example, when deployed, the plunger structure 1132 may push against the pliable material 1130 to form the conformal bump when the VLE apparatus 1100 is deployed. Although a plunger structure 1132 is depicted, any other actuator (e.g., a cam actuator, a rotary actuator, etc.) may additionally or alternatively be used. Although a hemispherical conformal bump structure is depicted, the conformal bump structure may have any other geometric shape such as, for example, a triangle, a rectangle, a crescent moon, etc. In some instances, the conformal bump structure may include more than one geometric shapes or structures (e.g., more than one crescent moons, more than one triangles, etc.).

In the illustrated examples of FIGS. 11A and 11B, the VLE apparatus 1100 may be deployed or stowed based on a measurement of a sensor 1136. In some examples, the VLE apparatus 1100 deploys in response to determining that the amount of lift generated by the wings 1106,1108 is not sufficient based on the altitude measurement, the angle of attack measurement, the speed measurement, etc. of the sensor 1136. In some instances, the VLE apparatus 1100 deploys in response to determining that an altitude measurement and/or a speed measurement as measured by the sensor 1136 does not satisfy a threshold (e.g., an altitude measurement is less than a maximum altitude threshold, a speed measurement is less than a maximum speed threshold, etc.). In some examples, the VLE apparatus 1100 is stowed in response to determining that the amount of lift generated by the wings 1106,1108 is sufficient based on the measurement of the sensor 1136. For example, the VLE apparatus 1100 may determine that the amount of lift generated by the wings 1106,1108 is sufficient based on an altitude measurement, an angle of attack measurement, a speed measurement, etc. of the sensor 1136.

Figure 12A:
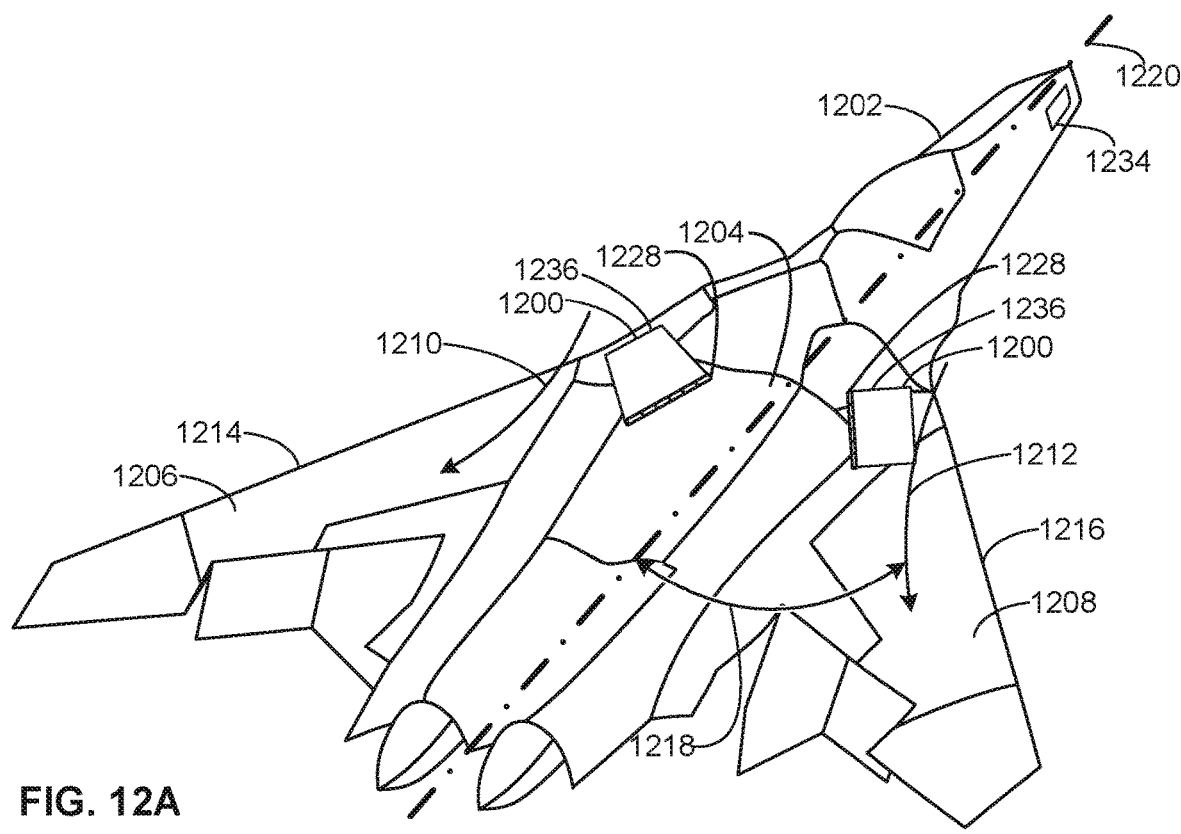
FIGS. 12A and 12B depict yet another example vortex lift enhancer apparatus in a stowed position and a deployed position.
Figure 12B:
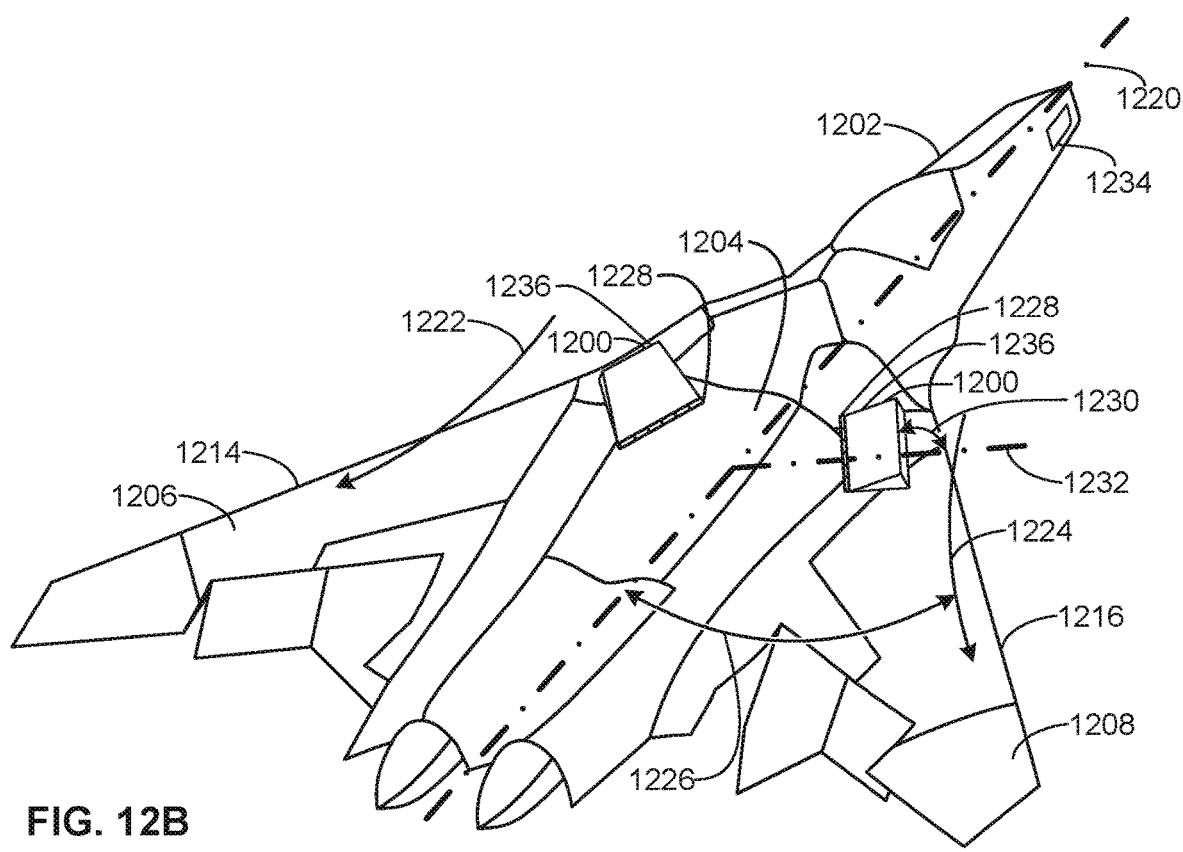

FIGS. 12A and 12B depict yet another example of a VLE apparatus 1200 operatively coupled to a highly-swept wing aircraft 1202. In the illustrated example, the VLE apparatus 1200 is an air fence structure or an air wall structure. The material of the air wall 1236 may include a metal material and/or a plastic material. There are two example VLE apparatus 1200, one on each side of the aircraft 1202. In the illustrated example, although there are two example VLE apparatus 1200 depicted, some examples may include one or more than two VLE apparatus 1200. The descriptions and details below apply to both example VLE apparatus 1200.

In the illustrated example of FIG. 12A, the VLE apparatus 1200 is in the stowed position (e.g., non-deployed position). In the illustrated example, the VLE apparatus 1200 is operatively coupled to a fuselage 1204 above highly-swept wings 1206,1208 of the aircraft 1202. The aerodynamic effects of the wings 1206,1208 may create leading-edge vortices 1210,1212 along leading-edges 1214,1216. For example, the wing 1208 may generate a leading-edge vortex 1212 at an angle 1218 with respect to an axis 1220 of the aircraft 1202. The example VLE apparatus 1200, when stowed, does not project above the surface of the fuselage 1204 and is, instead, flush with a curvature of the fuselage 1204.

In the illustrated example of FIG. 12B, the VLE apparatus 1200 is in the deployed position. The example VLE apparatus 1200 may redirect airflow above the highly-swept wings 1206,1208 of the aircraft 1202. For example, oncoming air may be re-directed spanwise along leading-edges 1214,1216 of the wings 1206,1208 when the oncoming air encounters the deployed VLE apparatus 1200. Redirecting oncoming air may alter the leading-edge vortices 1210,1212 generated by the highly-swept wings 1206,1208. For example, the deployment of the example VLE apparatus 1200 may alter the leading-edge vortices 1210,1212 into leading-edge vortices 1222,1224. For example, the example VLE apparatus 1200 may adjust the leading-edge vortex 1224 to an angle 1226 with respect to the axis 1220 of the aircraft 1202. In the illustrated examples of FIGS. 12A and 12B, the angle 1226 is greater than the angle 1218 due to the deployment of the example VLE apparatus 1200.

In the illustrated example, the air wall 1236 may be operatively coupled to the fuselage 1204 via a hinge 1228. When deployed, the hinge 1228 may enable the air wall 1236 to move from a stowed position to a deployed position. The deployed position may be a position where the air wall 1236 projects above the surface of the fuselage 1204 of the aircraft 1202. For example, when deployed, the VLE apparatus 1200 may move to a position at an angle 1230 with respect to an axis 1232 of the aircraft 1202.

In the illustrated examples of FIGS. 12A and 12B, the VLE apparatus 1200 may be deployed or stowed based on a measurement of a sensor 1234. In some examples, the VLE apparatus 1200 deploys in response to determining that the amount of lift generated by the wings 1206,1208 is not sufficient based on the altitude measurement, the angle of attack measurement, the speed measurement, etc. of the sensor 1234. In some instances, the VLE apparatus 1200 deploys in response to determining that an altitude measurement and/or a speed measurement as measured by the sensor 1234 does not satisfy a threshold (e.g., an altitude measurement is less than a maximum altitude threshold, a speed measurement is less than a maximum speed threshold, etc.). In some examples, the VLE apparatus 1200 is stowed in response to determining that the amount of lift generated by the wings 1206,1208 is sufficient based on the measurement of the sensor 1234. For example, the VLE apparatus 1200 may determine that the amount of lift generated by the wings 1206,1208 is sufficient based on an altitude measurement, an angle of attack measurement, a speed measurement, etc. of the sensor 1234.

Figure 13:
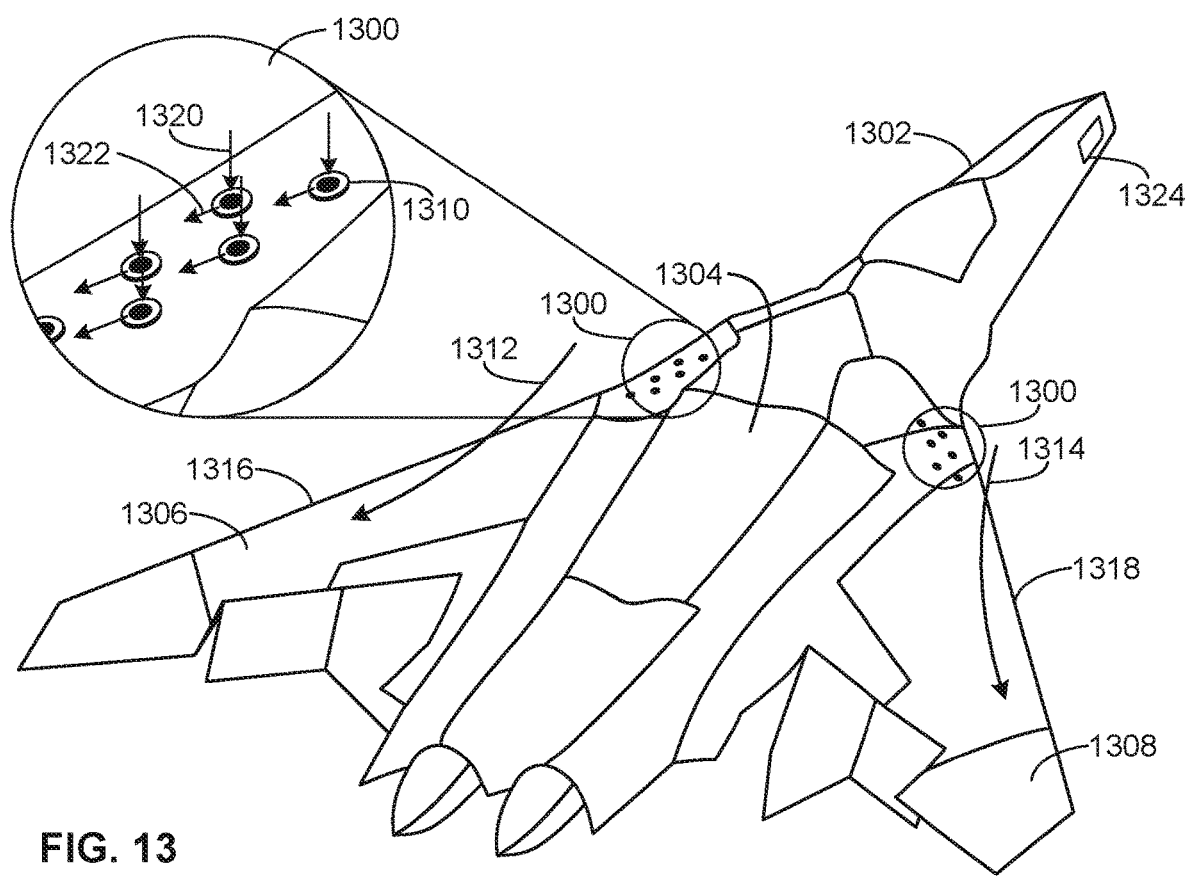
FIG. 13 depicts yet another example vortex lift enhancer apparatus.

FIG. 13 depicts yet another example of a VLE apparatus 1300 operatively coupled to a highly-swept wing aircraft 1302. The example VLE apparatus 1300 are located on both sides of the aircraft 1302. In the illustrated example, the VLE apparatus 1300 is operatively coupled to a fuselage 1304 above highly-swept wings 1306,1308 of the aircraft 1302. Additionally or alternatively, the example VLE apparatus 1300 may be located elsewhere on top of the fuselage 1304 aside from locations depicted in the illustrated example.

The example VLE apparatus 1300 includes perforations 1310 (e.g., air jets) to cause an expulsion of air and/or a suction of air to extend leading-edge vortices 1312,1314 spanwise along leading-edges 1316,1318 of the wings 1306, 1308 of the aircraft 1302 via flow control (e.g., active flow control). For example, the perforations 1310 may be individually connected to respective valves or collectively connected to one or more valves via pneumatic tubes. The valve(s) may be actuated via an actuator (e.g., a zero-mass-flux (ZMF) actuator, a piezoelectric actuator, etc.) to enable the expulsion of air and/or the suction of air. In some examples, the valve(s) may be actuated to connect an air supply to the perforations 1310 to enable an expulsion of pressurized air through the perforations 1310. For example, the valve(s) may be actuated to enable the perforations 1310 to expel air in a direction 1322 to disrupt, enhance, or redirect the flow of air over the wings 1306,1308 of the aircraft 1302. In some instances, the valve(s) may be actuated to either enable the expulsion of air or actuated to connect a suction mechanism (e.g., a vacuum) to the perforations 1310 to enable the suction of air in a direction 1320 through the perforations 1310. For example, the valve(s) may be actuated to enable the perforations 1310 to pull in the boundary layer airflow via suction to smooth the air flowing over the surface of the wings 1306,1308 while one or more of the remaining valves are actuated to enable the perforations 1310 to expel pressurized air. Expelling air while pulling in the boundary layer airflow may disrupt, enhance, or redirect the flow of air over the wings 1306,1308 of the aircraft 1302. Expelling air while pulling in the boundary layer airflow may also enhance the amount of lift generated by the wings 1306,1308 and/or the VLE apparatus 1300.

In the illustrated example of FIG. 13, the perforations 1310 included in the VLE apparatus 1300 may be actuated based on a measurement of a sensor 1324. For example, the VLE apparatus 1300 may enable the perforations 1310 to expel and/or pull in air in response to determining that an altitude measurement and/or a speed measurement as measured by the sensor 1324 satisfies a threshold (e.g., an altitude measurement is less than a maximum altitude threshold, a speed measurement is less than a maximum speed threshold, etc.). In some examples, the VLE apparatus 1300 may enable one or more perforations 1310 to expel air and/or other pressurized gas while enabling the remaining perforations 1310 to pull in the boundary layer airflow via suction.

Figure 14A:
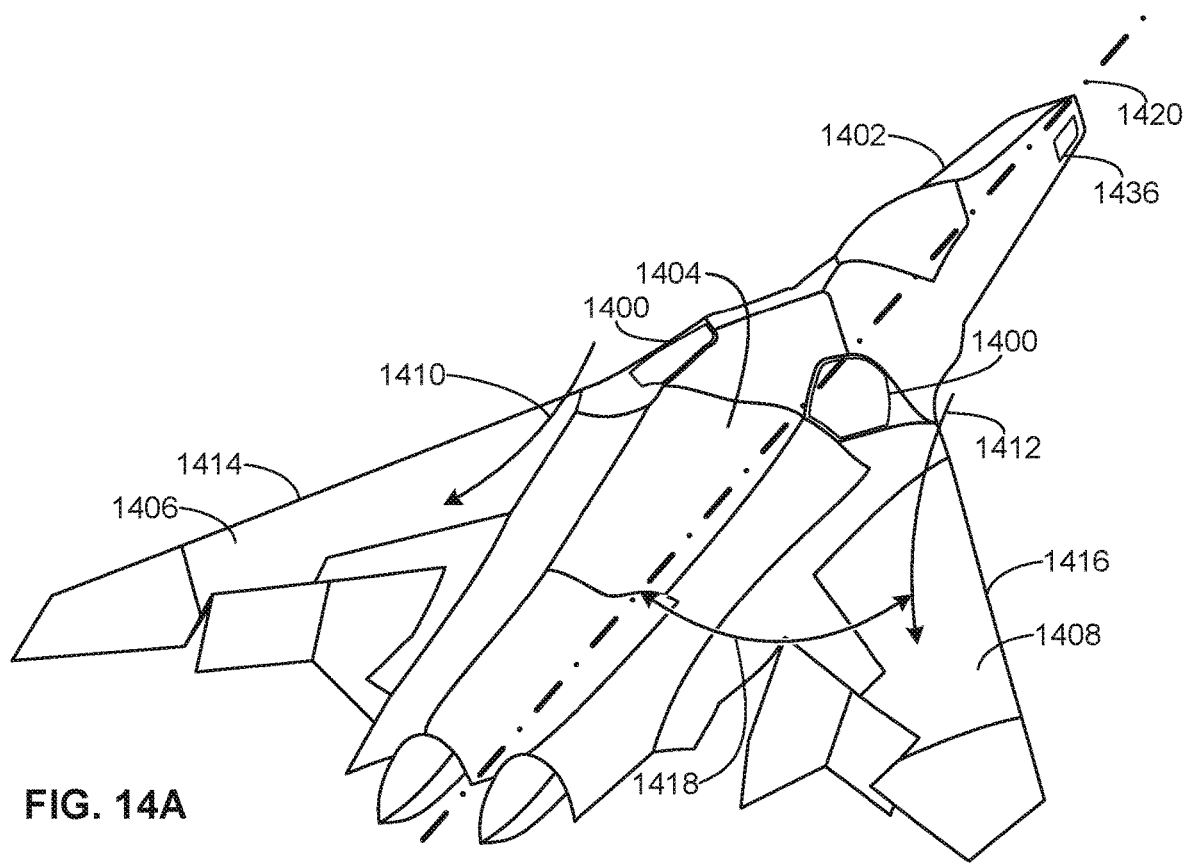
FIGS. 14A and 14B depict yet another example vortex lift enhancer apparatus in a stowed position and a deployed position.
Figure 14B:
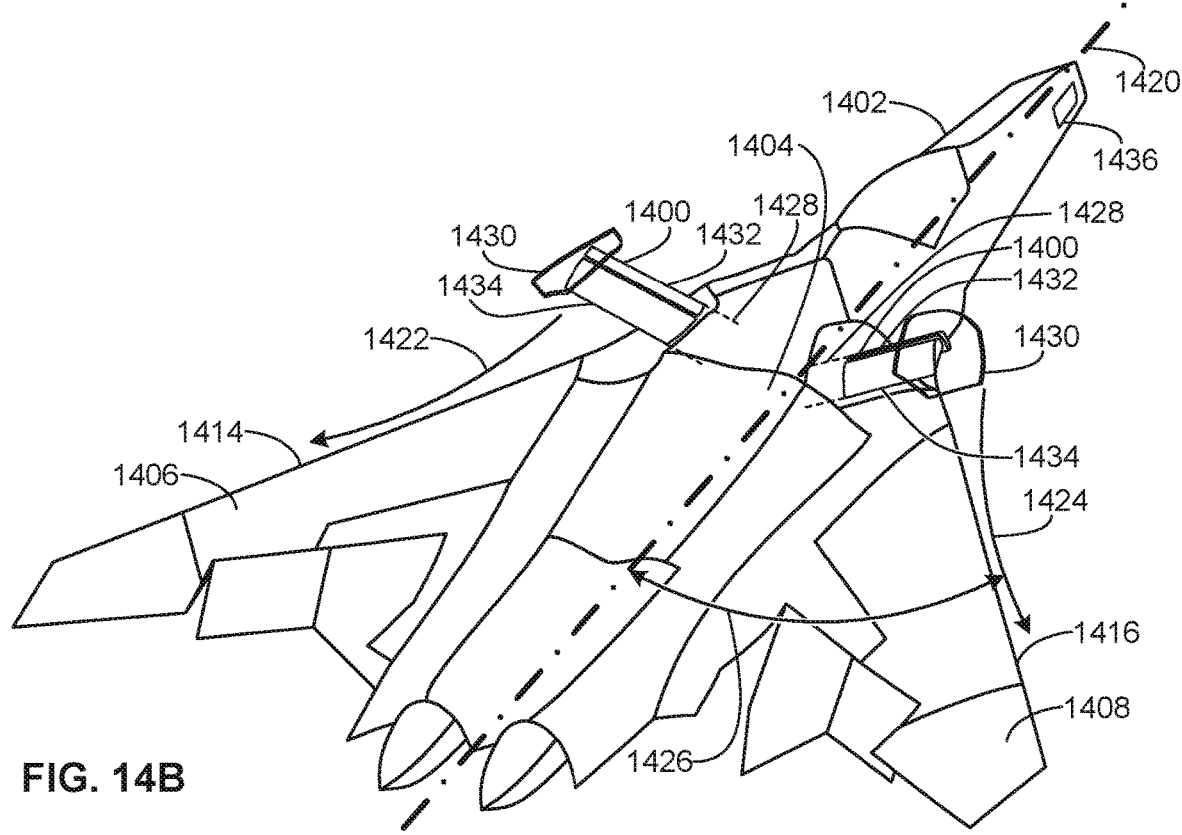

FIGS. 14A and 14B depict yet another example of a VLE apparatus 1400 operatively coupled to a highly-swept wing aircraft 1402. In the illustrated example, the VLE apparatus 1400 is a shoulder wing apparatus. There are two example VLE apparatus 1400, one on each side of the aircraft 1402. In the illustrated example, although there are two example VLE apparatus 1400 depicted, some examples may include one or more than two VLE apparatus 1400. The descriptions and details below apply to both example VLE apparatus 1400.

In the illustrated example of FIG. 14A, the VLE apparatus 1400 is in the stowed position (e.g., non-deployed position). In the illustrated example, the VLE apparatus 1400 is operatively coupled to a fuselage 1404 above highly-swept wings 1406,1408 of the aircraft 1402. The aerodynamic effects of the wings 1406,1408 may create leading-edge vortices 1410,1412 along leading-edges 1414,1416. For example, the wing 1408 may generate a leading-edge vortex 1412 at an angle 1418 with respect to an axis 1420 of the aircraft 1402. The example VLE apparatus 1400, when stowed, does not project above the surface of the fuselage 1404 and is, instead, flush with a curvature of the fuselage 1404.

In the illustrated example of FIG. 14B, the VLE apparatus 1400 is in the deployed position. The example VLE apparatus 1400 may redirect airflow above the highly-swept wings 1406,1408 of the aircraft 1402. For example, oncoming air may be re-directed spanwise along the leading-edges 1414,1416 of the wings 1406,1408 when the oncoming air encounters the deployed VLE apparatus 1400. Redirecting oncoming air may alter the leading-edge vortices 1410,1412 generated by the highly-swept wings 1406,1408. For example, the deployment of the example VLE apparatus 1400 may alter the leading-edge vortices 1410,1412 into leading-edge vortices 1422,1424. For example, the example VLE apparatus 1400 may adjust the leading-edge vortex 1424 to an angle 1426 with respect to the axis 1420 of the aircraft 1402. In the illustrated examples of FIGS. 14A and 14B, the angle 1426 is greater than the angle 1418 due to the deployment of the example VLE apparatus 1400.

In the illustrated example, the VLE apparatus 1400 may be deployed via tracks 1428. For example, the VLE apparatus 1400 may move along a linear rail or linear track system from the stowed position to a deployed position, where the deployed position projects above the fuselage 1404. The example VLE apparatus 1400 is coupled to a sealing panel 1430. When the example VLE apparatus 1400 is in the stowed position, the sealing panel 1430 enables the VLE apparatus 1400 to remain flush with the curvature of the fuselage 1404.

The example VLE apparatus 1400 includes multiple elements. For example, the VLE apparatus 1400 includes turning vanes 1432,1434 (e.g., air flow redirection surfaces). The turning vanes 1432,1434 may redirect oncoming airflow spanwise along the leading-edges 1414,1416. By redirecting oncoming airflow spanwise along the leading-edges 1414, 1416, the turning vanes 1432,1434 may adjust the leading-edge vortices 1422,1424. In the illustrated example, although there are two turning vanes 1432,1434 depicted, some examples may include one or more than two turning vanes.

In the illustrated examples of FIGS. 14A and 14B, the VLE apparatus 1400 may be deployed or stowed based on a measurement of a sensor 1436. In some examples, the VLE apparatus 1400 deploys in response to determining that the amount of lift generated by the wings 1406,1408 is not sufficient based on the altitude measurement, the angle of attack measurement, the speed measurement, etc. of the sensor 1436. In some instances, the VLE apparatus 1400 deploys in response to determining that an altitude measurement and/or a speed measurement as measured by the sensor 1436 does not satisfy a threshold (e.g., an altitude measurement is less than a maximum altitude threshold, a speed measurement is less than a maximum speed threshold, etc.). In some examples, the VLE apparatus 1400 is stowed in response to determining that the amount of lift generated by the wings 1406,1408 is sufficient based on the measurement of the sensor 1436. For example, the VLE apparatus 1400 may determine that the amount of lift generated by the wings 1406,1408 is sufficient based on an altitude measurement, an angle of attack measurement, a speed measurement, etc. of the sensor 1436.

Figure 15:
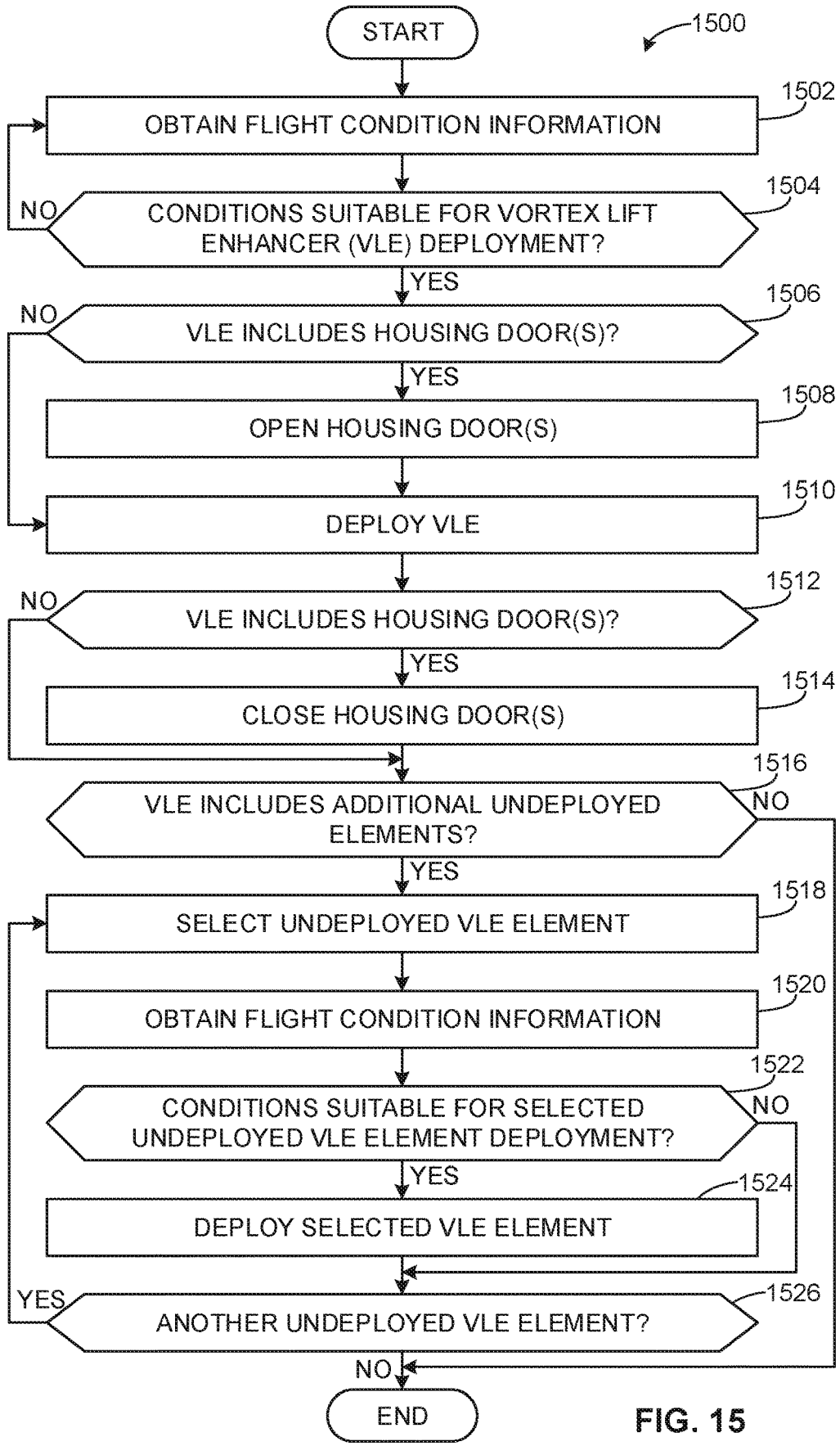
FIG. 15 is a flowchart representative of an example method that may be used to deploy the example vortex lift enhancer apparatus of FIGS. 2-14.
Figure 16:
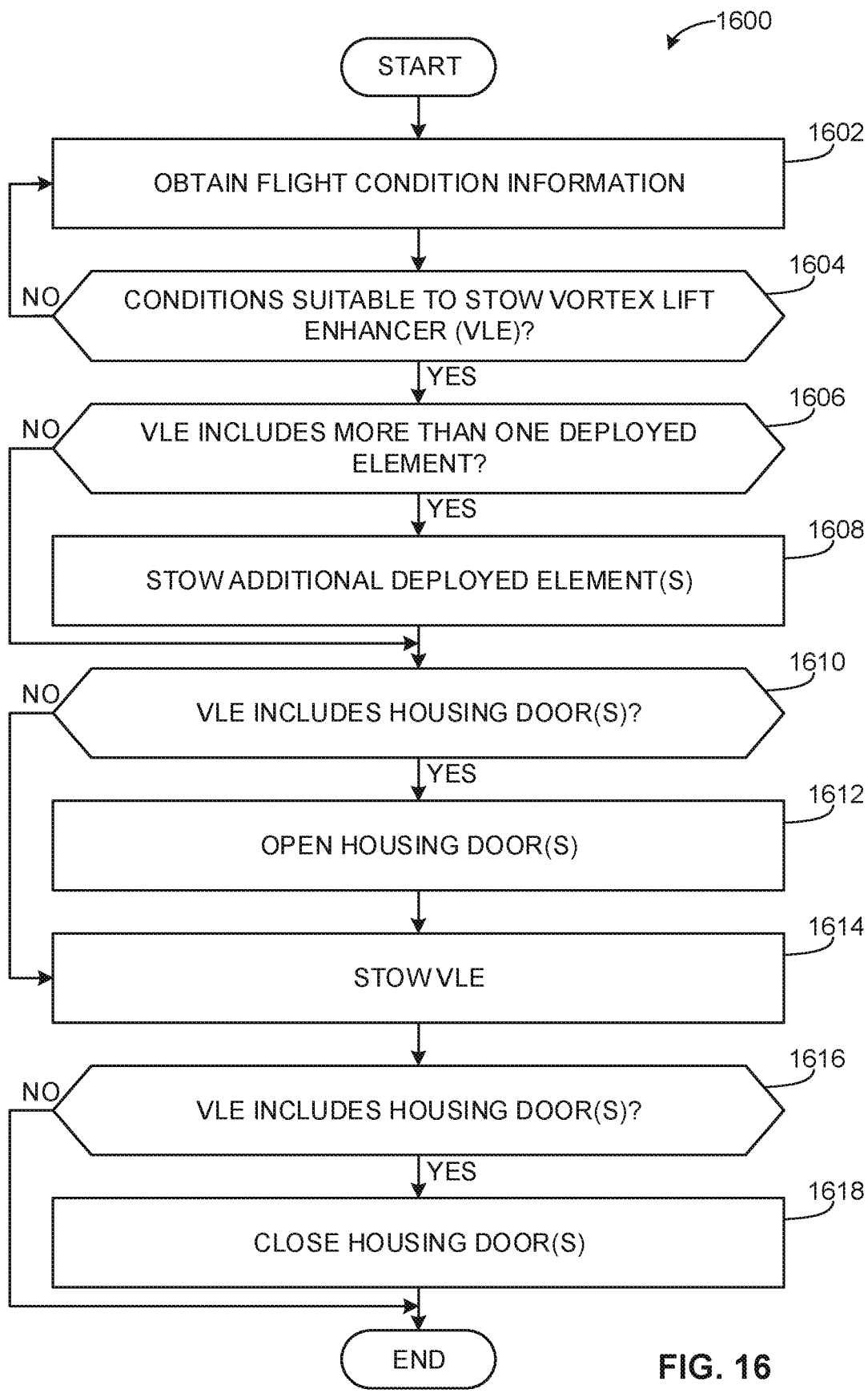
FIG. 16 is a flowchart representative of an example method that may be used to stow the example vortex lift enhancer apparatus of FIGS. 2-14.

Flowcharts representative of example methods for implementing the example vortex lift enhancer apparatus 200, 500,1000,1100,1200,1300,1400 of FIGS. 2-14 are shown in FIGS. 15-16. In these examples, the methods may be implemented using machine readable instructions that comprise a program for execution by a processor such as the processor 1712 shown in the example processor platform 1700 discussed below in connection with FIG. 17. The program may be embodied in software stored on a tangible computer readable storage medium such as a CD-ROM, a floppy disk, a hard drive, a digital versatile disk (DVD), a Blu-ray disk, or a memory associated with the processor 1712, but the entire program and/or parts thereof could alternatively be executed by a device other than the processor 1712 and/or embodied in firmware or dedicated hardware. Further, although the example program is described with reference to the flowcharts illustrated in FIGS. 15-16, many other methods of implementing the example vortex lift enhancer apparatus 200,500,1000,1100,1200,1300,1400 of FIGS. 2-14 may alternatively be used. For example, the order of execution of the blocks may be changed, and/or some of the blocks described may be changed, eliminated, or combined.

As mentioned above, the example methods of FIGS. 15-16 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 15-16 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 15 is a flowchart representative of an example method 1500 that may be performed by the example vortex lift enhancer apparatus 200,500,1000,1100,1200,1300,1400 of FIGS. 2-14. The example method 1500 begins at block 1502 when a vortex lift enhancer obtains flight condition information of the aircraft. For example, a processor may obtain flight condition information from one or more sensors measuring airspeed, altitude, etc. In some examples, the flight condition information may be information obtained from a computer network such as, for example, a central facility and/or a communication server via satellite communication. In some instances, the flight condition information may be an aircraft condition such as, for example, a status of landing gear deployment.

At block 1504, the vortex lift enhancer determines whether the conditions are suitable for vortex lift enhancer (VLE) deployment. For example, the processor may determine that the obtained air speed and altitude measurements coupled with the deployment of the landing gear satisfies one or more conditions suitable for shoulder wing deployment. If, at block 1504, the VLE determines that the conditions are not suitable for VLE deployment, control returns to block 1502 to obtain additional flight condition information. If, at block 1504, the VLE determines that the conditions are suitable for VLE deployment, then at block 1506, the VLE determines whether the VLE includes housing door(s). At block 1506, the VLE determines whether the VLE includes the housing door(s). For example, the processor may determine that the VLE apparatus 200 includes the housing doors 710,712. If, at block 1506, the VLE determines that the VLE does not include the housing door(s), control proceeds to block 1510 to deploy the VLE. If, at block 1506, the VLE determines that the VLE does include the housing door(s), then, at block 1508, the VLE opens the housing door(s). At block 1508, the VLE opens the housing door(s). For example, the processor may cause the VLE apparatus 200 to open the housing doors 710,712.

At block 1510, the VLE deploys. For example, the processor may cause one or more VLE actuator apparatus 600 to move the shoulder wings included in the VLE apparatus 200 from a stowed position to a deployed position. In another example, the processor may cause one or perforations 1310 included in the VLE apparatus 1300 to expel pressurized air in the direction 1320. At block 1512, the VLE determines whether the VLE includes housing door(s). For example, the processor may determine that the VLE apparatus 200 includes housing doors 710,712. If, at block 1512, the VLE determines that the VLE does not include the housing door(s), control proceeds to block 1516 to determine if the VLE includes additional undeployed elements. If, at block 1512, the VLE determines that the VLE does include the housing door(s), then, at block 1514, the VLE closes the housing door(s). For example, the processor may cause the VLE apparatus 200 to close the housing doors 710,712.

At block 1516, the VLE determines whether the VLE includes additional undeployed elements. For example, the processor may determine that the VLE apparatus 500 includes the slats 502,504 and the flaps 506,508. If, at block 1516, the VLE determines that there are no additional undeployed elements, the example method 1500 concludes. If, at block 1516, the VLE determines that there are additional undeployed elements, then, at block 1518, the VLE selects an undeployed VLE element. For example, the processor may select slat 502 included in the VLE apparatus 500. At block 1520, the VLE obtains flight condition information. For example, the processor may obtain flight condition information from one or more sensors measuring airspeed, altitude, etc. In some examples, the flight condition information may be information obtained from a computer network such as, for example, a central facility and/or a communication server via satellite communication. In some instances, the flight condition information may be an aircraft condition such as, for example, a status of landing gear deployment. In some examples, the flight condition information indicates that an amount of lift generated by wings of the aircraft and/or the VLE requires enhancement.

At block 1522, the VLE determines whether conditions are suitable for the selected VLE element deployment. For example, the processor may determine that flight condition information obtained from the one or more sensors indicates that the amount of lift generated by the wings of the aircraft and/or the VLE may require enhancement. For example, the processor may determine that actuating the slat 502 via the slat actuator 514 would enhance the amount of lift generated by the wings of the aircraft and/or the VLE. If, at block 1522, the VLE determines that conditions are not suitable for the selected VLE element deployment, then control proceeds to block 1526 to determine whether there is another VLE element that is undeployed. If, at block 1522, the VLE determines that conditions are suitable for the selected VLE element deployment, then, at block 1524, the VLE deploys the selected VLE element.

At block 1524, the VLE deploys the selected VLE element. For example, the processor may cause the slats 502 included in the VLE apparatus 500 to deploy via the slat actuator 514. In another example, the processor may cause the one or more perforations 1024 included in the VLE apparatus 1000 to expel pressurized air in the direction 1026. At block 1526, the VLE determines whether there is another undeployed VLE element. For example, the processor may determine that the slats 504 and/or the flaps 506,508 included in the VLE apparatus 500 are not deployed. In another example, the processor may determine there are additional perforations 1024 included in the VLE apparatus 1000 that are not deployed. If, at block 1526, the VLE determines that there is another undeployed VLE element, control returns to block 1518 to select another VLE element, otherwise the example method 1500 concludes.

FIG. 16 is a flowchart representative of an example method 1600 that may be performed by the example vortex lift enhancer apparatus 200,500,1000,1100,1200,1300,1400 of FIGS. 2-14. The example method 1600 begins at block 1602 when a vortex lift enhancer obtains flight condition information of the aircraft. For example, a processor may obtain flight condition information from one or more sensors measuring airspeed, altitude, etc. In some examples, the flight condition information may be information obtained from a computer network such as, for example, a central facility and/or a communication server via satellite communication. In some instances, the flight condition information may be an aircraft condition such as, for example, a status of landing gear deployment.

At block 1604, the vortex lift enhancer determines whether the conditions are suitable to stow the vortex lift enhancer (VLE). For example, the processor may determine that the obtained air speed and altitude measurements coupled with the stowing of the landing gear satisfies one or more conditions suitable to stow the VLE. If, at block 1604, the VLE determines that the conditions are not suitable to stow the VLE, control returns to block 1602 to obtain additional flight condition information. If, at block 1604, the VLE determines that the conditions are suitable to stow the VLE, then at block 1606, the VLE determines whether the VLE includes more than one deployed element. At block 1606, the VLE determines whether the VLE includes more than one deployed element. For example, the processor may determine that in addition to the deployed shoulder wings included in the VLE apparatus 200, the VLE apparatus 200 may also include one or more deployed slats 502,504 and/or one or more deployed flaps 506,508. If, at block 1606, the VLE determines that the VLE includes more than one deployed element, then, at block 1608, the VLE stows additional deployed element(s). If, at block 1606, the VLE determines that the VLE does not include more than one deployed element, control proceeds to block 1610 to determine whether the VLE includes housing door(s).

At block 1608, the VLE stows additional deployed element(s). For example, the processor may cause the stowing of one or more deployed slats 502,504 and/or the one or more deployed flaps 506,508 via the slat actuators 514,516 and/or the flap actuators 518,520. At block 1610, the VLE determines whether the VLE includes housing door(s). For example, the processor may determine that the VLE apparatus 200 includes housing doors 710,712. If, at block 1610, the VLE determines that the VLE does include housing door(s), then, at block 1612, the VLE opens the housing door(s). If, at block 1610, the VLE determines that the VLE does not include housing door(s), then, at block 1614, the VLE stows the VLE. At block 1612, the VLE opens the housing door(s). For example, the processor may cause the housing doors 710,712 to open. At block 1614, the VLE stows the VLE. For example, the processor may cause the one or more VLE actuator apparatus 600 to move the shoulder wings included in the VLE apparatus 200 from a deployed position to a stowed position. At block 1616, the VLE determines whether the VLE includes the housing door(s). For example, the processor may determine that the VLE apparatus 200 includes housing doors 710,712. If, at block 1616, the VLE determines that the VLE does include housing door(s), then, at block 1618, the VLE closes the housing doors, otherwise the example method 1600 concludes.

Figure 17:
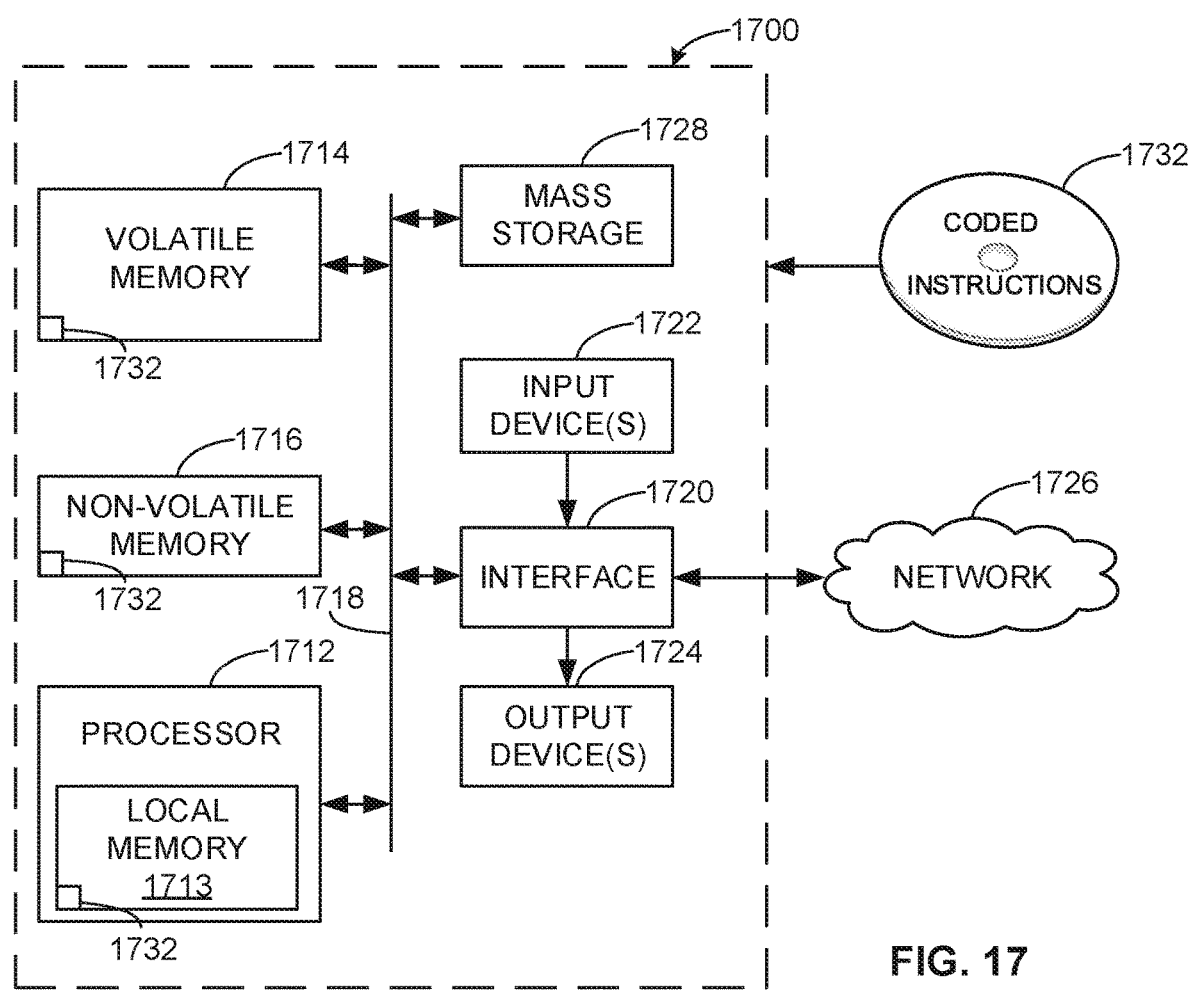
FIG. 17 is a block diagram of an example processor platform structured to execute machine readable instructions to implement the methods of FIGS. 15-16 and the example vortex lift enhancer apparatus of FIGS. 2-14.

FIG. 17 is a block diagram of an example processor platform 1700 capable of executing instructions to implement the methods of FIGS. 15-16 and the apparatus of FIGS. 2-14. The processor platform 1700 can be, for example, a server, an aircraft computer, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors or controllers from any desired family or manufacturer.

The processor 1712 of the illustrated example includes a local memory 1713 (e.g., a cache). The processor 1712 of the illustrated example executes the instructions to implement the example vortex lift enhancer apparatus 200,500, 1000,1100,1200,1300,1400. The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1716 may be implemented by flash memory and/or any other desired type of memory device. Access to the main memory 1714,1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), and/or a PCI express interface.

In the illustrated example, one or more input devices 1722 are connected to the interface circuit 1720. The input device(s) 1722 permit(s) a user to enter data and commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display, a cathode ray tube display (CRT), a touchscreen, a heads-up display, a tactile output device, a printer and/or speakers). The interface circuit 1720 of the illustrated example, thus, typically includes a graphics driver card, a graphics driver chip or a graphics driver processor.

The interface circuit 1720 of the illustrated example also includes a communication device such as a transmitter, a receiver, a transceiver, a modem and/or network interface card to facilitate exchange of data with external machines (e.g., computing devices of any kind) via a network 1726 (e.g., an Ethernet connection, a digital subscriber line (DSL), a telephone line, coaxial cable, a cellular telephone system, etc.).

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, RAID systems, and digital versatile disk (DVD) drives.

Coded instructions 1732 to implement the methods of FIGS. 15-16 may be stored in the mass storage device 1728, in the volatile memory 1714, in the non-volatile memory 1716, and/or on a removable tangible computer readable storage medium such as a CD or DVD.

From the foregoing, it will be appreciated that the above disclosed vortex lift enhancer apparatus and methods extend a leading-edge vortex spanwise along a highly-swept wing of an aircraft. As a result, a lift generation capability by the aircraft during flight operations that requires a high angle of attack is enhanced. Also, the above disclosed vortex lift enhancer apparatus and methods affect a pressure field above the highly-swept wing of the aircraft and reduce drag by delaying or preventing a vortex burst along a leading-edge of the highly-swept wing of the aircraft.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
  a shoulder wing coupled to a fuselage of an aircraft, the aircraft including a first highly-swept wing on a first side of the aircraft and a second highly-swept wing on a second side of the aircraft opposite the first side, the shoulder wing coupled to the fuselage on the first side of the aircraft above the first highly-swept wing, the shoulder wing operative to move from a first position to a second position to extend a leading-edge vortex spanwise along the first highly-swept wing of the aircraft;
  a shoulder wing housing coupled to the fuselage, the shoulder wing housing to stow the shoulder wing in the first position; and
  a door coupled to the shoulder wing housing, the door operative to move from a third position to a fourth position in response to the shoulder wing moving from the first position to the second position, the door operative to return to the third position in response to the shoulder wing moving to the second position.

2. The apparatus of claim 1, further including an actuator to operatively couple the shoulder wing to the fuselage to move the shoulder wing from the first position to the second position in a counter-clockwise direction.

3. The apparatus of claim 2, wherein the shoulder wing is behind a leading-edge of the first highly-swept wing, and the first position is at a first angle relative to a longitudinal axis of the fuselage and the second position is at a second angle relative to the longitudinal axis of the fuselage, the second angle different than the first angle.

4. The apparatus of claim 1, further including a slat coupled to the shoulder wing facing a first direction of the aircraft and a flap coupled to the shoulder wing facing a second direction of the aircraft.

5. The apparatus of claim 4, wherein the slat is operatively coupled to the shoulder wing via a slat actuator to further extend the leading-edge vortex spanwise along the first highly-swept wing of the aircraft.

6. The apparatus of claim 4, wherein the flap is operatively coupled to the shoulder wing via a flap actuator to further extend the leading-edge vortex spanwise along the first highly-swept wing of the aircraft.

7. The apparatus of claim 4, further including at least one of a second slat, a second slat actuator, a second flap, or a second flap actuator.

8. The apparatus of claim 1, further including at least one perforation on the shoulder wing, the perforation enabling an expulsion of pressurized air to further extend the leading-edge vortex spanwise along the first highly-swept wing of the aircraft.

9. The apparatus of claim 1, wherein the aircraft is a tailless aircraft.

10. The apparatus of claim 1, wherein the shoulder wing in the second position delays a burst of the leading-edge vortex to increase a lift-to-drag ratio of the aircraft.

11. The apparatus of claim 1, further including an actuator to operatively couple the shoulder wing to the fuselage to move the shoulder wing from the first position to the second position in a counter-clockwise direction and to move the shoulder wing from the second position to the first position in a clockwise direction.

12. A non-transitory computer readable storage medium comprising instructions that, when executed, cause at least one processor to at least:
  control a housing door operatively coupled to a shoulder wing housing of an aircraft to move from a first position to a second position, the shoulder wing housing to stow a shoulder wing of the aircraft in a third position, the aircraft including a first highly-swept wing on a first side of the aircraft and a second highly-swept wing on a second side of the aircraft, the second side opposite the first side, the shoulder wing coupled to a fuselage of the aircraft on the first side above the first highly-swept wing, the shoulder wing housing coupled to the fuselage;
  in response to the housing door moving to the second position, control the shoulder wing to move from the third position to a fourth position, the shoulder wing in the fourth position to extend a leading-edge vortex spanwise along a leading-edge of the first highly-swept wing of the aircraft; and
  in response to the shoulder wing moving to the fourth position, control the housing door to move from the second position to the first position.

13. The non-transitory computer readable storage medium of claim 12, wherein the instructions, when executed, cause the at least one processor to:
  obtain a flight condition associated with the aircraft from a sensor;
  determine to increase a first quantity of lift being generated by the first highly-swept wing of the aircraft to a second quantity of lift greater than the first quantity of lift based on the flight condition; and
  determine to move the shoulder wing to the fourth position to generate the second quantity of lift.

14. The non-transitory computer readable storage medium of claim 13, wherein the flight condition is a first flight condition, and the instructions, when executed, cause the at least one processor to:
  determine to increase the second quantity of lift to a third quantity of lift greater than the second quantity of lift based on a second flight condition associated with the aircraft obtained from the sensor; and
  deploy at least one of a slat or a flap operatively coupled to the shoulder wing to move from a fifth position to a sixth position, the at least one of the slat or the flap in the sixth position to generate the third quantity of lift by further extending the leading-edge vortex spanwise along the leading-edge of the first highly-swept wing.

15. The non-transitory computer readable storage medium of claim 12, wherein the instructions, when executed, cause the shoulder wing to move to the fourth position to adjust the leading-edge vortex from moving above the leading edge of the first highly-swept wing at a first angle relative to a longitudinal axis of the aircraft to moving spanwise along the leading edge at a second angle relative to the longitudinal axis, the second angle greater than the first angle.

16. A method comprising:
  controlling a housing door operatively coupled to a shoulder wing housing of an aircraft to move from a first position to a second position, the shoulder wing housing to stow a shoulder wing of the aircraft in a third position, the aircraft including a first highly-swept wing on a first side of the aircraft and a second highly-swept wing on a second side of the aircraft, the second side opposite the first side, the shoulder wing coupled to a fuselage of the aircraft on the first side above the first highly-swept wing, the shoulder wing housing coupled to the fuselage;
  in response to the housing door moving to the second position, controlling the shoulder wing to move from the third position to a fourth position, the shoulder wing in the fourth position to extend a leading-edge vortex spanwise along a leading-edge of the first highly-swept wing of the aircraft; and in response to the shoulder wing moving to the fourth position, controlling the housing door to move from the second position to the first position.

17. The method of claim 16, further including:

obtaining a flight condition associated with the aircraft from a sensor;

determining to increase a first quantity of lift being generated by the first highly-swept wing of the aircraft to a second quantity of lift greater than the first quantity of lift based on the flight condition; and determining to move the shoulder wing to the fourth position to generate the second quantity of lift.

18. The method of claim 17, wherein the flight condition is a first flight condition, and further including:

determining to increase the second quantity of lift to a third quantity of lift greater than the second quantity of lift based on a second flight condition associated with the aircraft obtained from the sensor; and deploying at least one of a slat or a flap operatively coupled to the shoulder wing to move from a fifth position to a sixth position, the at least one of the slat or the flap in the sixth position to generate the third quantity of lift by further extending the leading-edge vortex spanwise along the leading-edge of the first highly-swept wing.

19. The method of claim 16, wherein the controlling of the shoulder wing to move to the fourth position is to adjust the leading-edge vortex from moving above the leading edge of the first highly-swept wing at a first angle relative to a longitudinal axis of the aircraft to moving spanwise along the leading edge at a second angle relative to the longitudinal axis, the second angle greater than the first angle.

20. The method of claim 16, further including controlling at least one perforation on the shoulder wing to enable an expulsion of pressurized air to further extend the leading-edge vortex spanwise along the first highly-swept wing of the aircraft.

* * * * *